(12) United States Patent
Iwanaga et al.

(10) Patent No.: US 10,161,111 B2
(45) Date of Patent: Dec. 25, 2018

(54) DISPLAY SYSTEM OF EXCAVATION MACHINE, EXCAVATION MACHINE, AND IMAGE DISPLAY METHOD

(71) Applicant: Komatsu Ltd., Tokyo (JP)

(72) Inventors: Daishi Iwanaga, Bungooono (JP); Takeshi Takaura, Mino (JP); Daiki Arimatsu, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/433,170

(22) PCT Filed: Sep. 9, 2014

(86) PCT No.: PCT/JP2014/073839
§ 371 (c)(1),
(2) Date: Apr. 2, 2015

(87) PCT Pub. No.: WO2015/030266
PCT Pub. Date: Mar. 5, 2015

(65) Prior Publication Data
US 2017/0175362 A1    Jun. 22, 2017

(51) Int. Cl.
*G06F 7/70*        (2006.01)
*G06F 19/00*       (2018.01)
(Continued)

(52) U.S. Cl.
CPC ............... *E02F 9/26* (2013.01); *E02F 3/32* (2013.01); *E02F 3/435* (2013.01); *E02F 9/261* (2013.01);
(Continued)

(58) Field of Classification Search
CPC .................. E02F 9/26; E02F 3/32; E02F 3/36
(Continued)

(56) References Cited

U.S. PATENT DOCUMENTS 5,854,988 A    12/1998  Davidson et al.
2011/0311342 A1*  12/2011  Montgomery ......... G01C 21/04
                                           414/685
(Continued)

FOREIGN PATENT DOCUMENTS

CN    103080437 A    5/2013
CN    103857852 A    6/2014
(Continued)

OTHER PUBLICATIONS

English Translation for JP2001098585A.*
International Search Report dated Dec. 16, 2014, issued for PCT/JP2014/073839.

*Primary Examiner* — Mahmoud S Ismail
(74) *Attorney, Agent, or Firm* — Locke Lord LLP

(57) ABSTRACT

A display system of an excavation machine including a work machine having a bucket and a body portion on which the work machine is mounted. The display system includes a bucket position information generator which generates position information of the bucket; a storage which stores information of a dimension of the bucket and information of a target construction surface indicating a target shape of a construction object; a display which displays an image of the target construction surface on a screen; and a processor which displays a straight line image that is generated by extracting a part corresponding to a bottom surface of the bucket, viewed from a side surface, along with the image of the target construction surface on the display.

12 Claims, 10 Drawing Sheets

(51) Int. Cl.
*G06G 7/00* (2006.01)
*G06G 7/76* (2006.01)
*E02F 9/26* (2006.01)
*E02F 3/43* (2006.01)
*G01S 19/14* (2010.01)
*G01S 19/43* (2010.01)
*G01S 19/54* (2010.01)
*E02F 3/32* (2006.01)
*B66C 23/00* (2006.01)
*B66F 9/00* (2006.01)
*E02F 3/00* (2006.01)
*G06F 3/0481* (2013.01)

(52) U.S. Cl.
CPC .............. *E02F 9/264* (2013.01); *G01S 19/14* (2013.01); *G01S 19/43* (2013.01); *G01S 19/54* (2013.01); *G06F 3/04817* (2013.01)

(58) Field of Classification Search
USPC ............................................ 701/50; 414/685
See application file for complete search history.

(56) References Cited

U.S. PATENT DOCUMENTS

| | | |
|---|---|---|
| 2013/0158787 A1 | 6/2013 | Nomura et al. |
| 2014/0099178 A1 | 4/2014 | Nomura et al. |
| 2015/0345114 A1 | 12/2015 | Nomura et al. |

FOREIGN PATENT DOCUMENTS

| | | | |
|---|---|---|---|
| CN | 103857853 A | | 6/2014 |
| CN | 103906879 A | | 7/2014 |
| JP | 10-103925 A | | 4/1998 |
| JP | 2001098585 A | * | 4/2001 |
| JP | 2012-172425 A | | 9/2012 |
| JP | 2013-231887 A | | 11/2013 |
| JP | 2014-074318 A | | 4/2014 |
| JP | 2014-098270 A | | 5/2014 |

* cited by examiner

DISPLAY SYSTEM OF EXCAVATION MACHINE, EXCAVATION MACHINE, AND IMAGE DISPLAY METHOD

FIELD

The present invention relates to a display system of an excavation machine, an excavation machine, and an image display method.

BACKGROUND

In general, an excavation machine such as an excavator digs the ground surface or the like of a working object as an operator drives a work machine including a bucket by operating an operation lever. For example, in Patent Literature 1, it is described that the gradient of the bottom portion of a bucket is displayed as a numerical value on a screen.

CITATION LIST

Patent Literature

Patent Literature 1: Japanese Patent Application Laid-open No. 10-103925

SUMMARY

Technical Problem

In a case where a part of a design surface of a construction object is referred to as a target construction surface and the ground surface of the construction object is dug by using an excavation machine such as an excavator so that the target construction surface is formed, an operator of the excavation machine needs information regarding the positional relationship between the target construction surface and a work machine. In the technique described in Patent Literature 1, although the gradient of the bottom portion of the bucket is displayed as a numerical value, there is a possibility that the information regarding the positional relationship between the target construction surface and the work machine including the bucket may be not provided for the operator to be easily understandable.

An object of the present invention is to provide information regarding a construction state for an operator to be easily understandable when the operator of the excavation machine performs construction.

Solution to Problem

According to the present invention, a display system of an excavation machine including a work machine having a bucket and a body portion on which the work machine is mounted, the display system of the excavation machine comprises: a bucket position information generation unit which generates position information of the bucket; a storage unit which stores information of a dimension of the bucket and information of a target construction surface indicating a target shape of a construction object; a display unit which displays an image of the target construction surface on a screen; and a processing unit which displays a straight line image that is generated by extracting a part corresponding to a bottom surface of the bucket viewed from a side surface along with the image of the target construction surface on the display unit.

In the present invention, it is preferable that the processing unit generates an image of the bucket separately from the straight line image, and displays the image of the bucket in a different display form from the straight line image on the display unit along with the straight line image.

In the present invention, it is preferable that the processing unit changes a display form of the straight line image before and after the bottom surface of the bucket and the target construction surface are parallel to each other.

In the present invention, it is preferable that the processing unit changes a display form of the straight line image according to an angle between the bottom surface of the bucket and the target construction surface.

In the present invention, it is preferable that the processing unit changes a display form of the straight line image according to a distance between the bottom surface of the bucket and the target construction surface.

According to the present invention, a display system of an excavation machine including a work machine having a bucket and a body portion on which the work machine is mounted, the display system of the excavation machine comprises: a bucket position information generation unit which generates position information of a cutting edge of the bucket; a storage unit which stores information of a dimension of the bucket and information of a target construction surface indicating a target shape of a construction object; a display unit which displays an image of the bucket and an image of the target construction surface on a screen; a processing unit which displays an image of the bucket viewed from a side surface and an image of the target construction surface on the display unit, and generates a straight line image by using the position information of the bucket and the information of the dimension of the bucket at a position corresponding to a bottom surface of the bucket viewed from the side surface to be displayed on the display unit; and a display switch device which switches between display and non-display of the straight line image.

According to the present invention, a display system of an excavation machine including a work machine having a bucket and a body portion on which the work machine is mounted, the display system of the excavation machine comprises: a bucket position information generation unit which generates position information of the bucket; a storage unit which stores information of a dimension of the bucket and information of a target construction surface indicating a target shape of a construction object; a display unit which displays an image of the target construction surface on a screen; and a processing unit which displays a straight line image indicating a part corresponding to a bottom surface of the bucket viewed from a side surface, and displays an image of the bucket of a part excluding the part corresponding to the bottom surface in a different display form from the straight line image on the display unit.

According to the present invention, an excavation machine comprises: the display system of an excavation machine.

According to the present invention, an image display method comprises: when an image is displayed on a display unit of an excavation machine which includes a work machine having a bucket, a body portion on which the work machine is mounted, and the display unit which displays at least an image of a target construction surface indicating a target shape of a construction object on a screen, displaying the image of the target construction surface on the display unit; and generating a straight line image by extracting a part corresponding to a bottom surface of the bucket viewed from a side surface to be displayed on the display unit.

The present invention can provide information regarding a construction state for an operator to be easily understandable when the operator of the excavation machine performs construction.

BRIEF DESCRIPTION OF DRAWINGS

FIG. 7-1 is a view illustrating an example of the guide screen.

FIG. 7-2 is a view illustrating an example of the guide screen.

DESCRIPTION OF EMBODIMENTS

Embodiments of the present invention will be described in detail with reference to the drawings.

<Overall Configuration of Excavation Machine>

Figure 1:
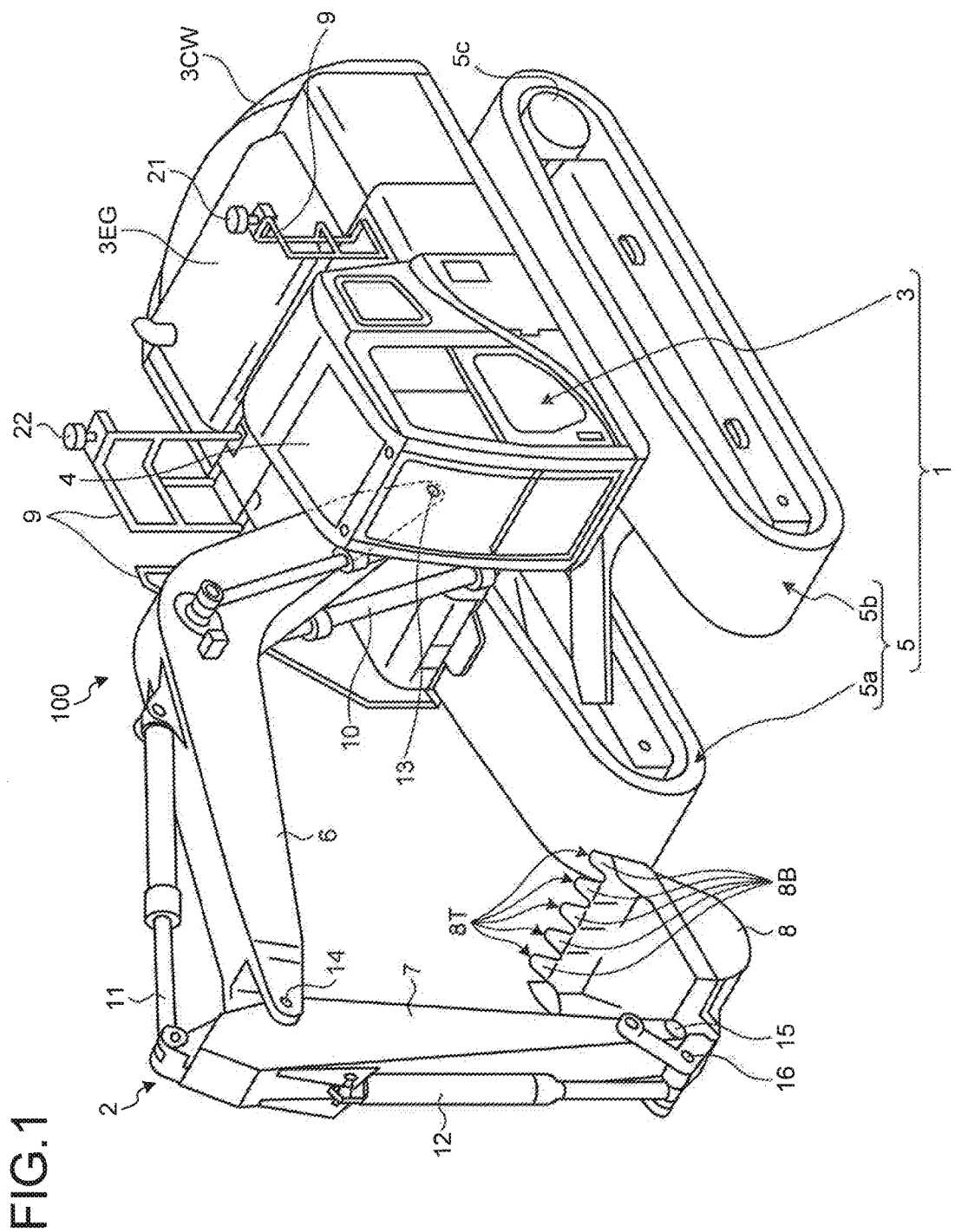
FIG. 1 is a perspective view of an excavator according to an embodiment.
Figure 2:
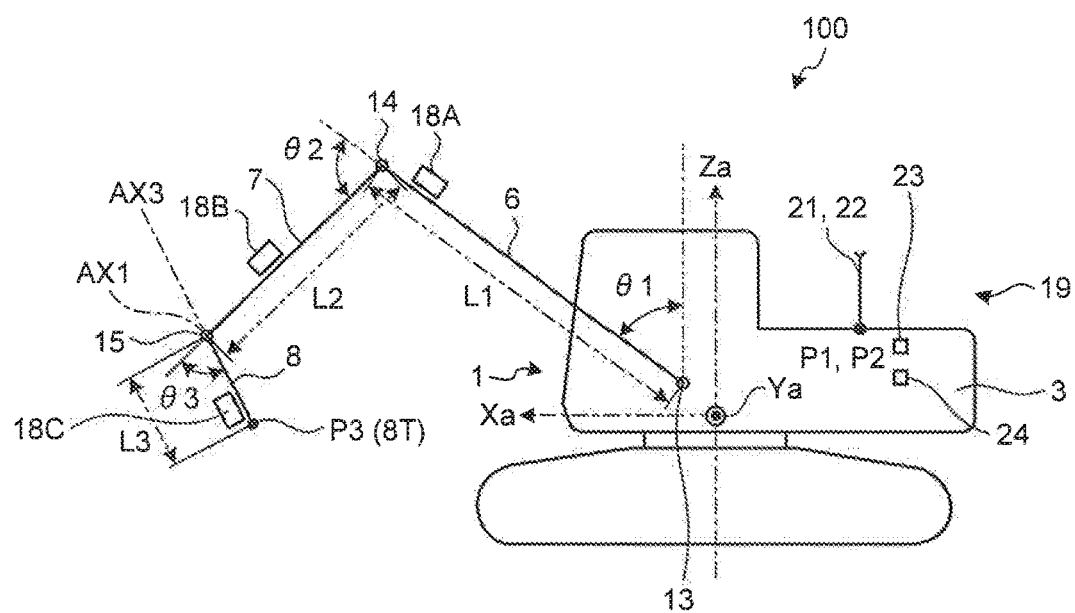
FIG. 2 is a side view of the excavator.
Figure 3:
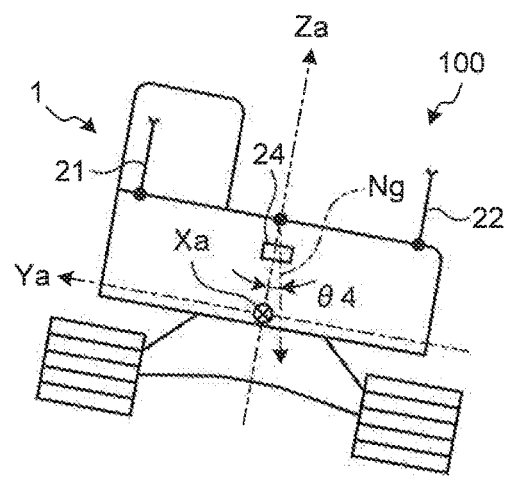
FIG. 3 is a rear view of the excavator.
Figure 4:
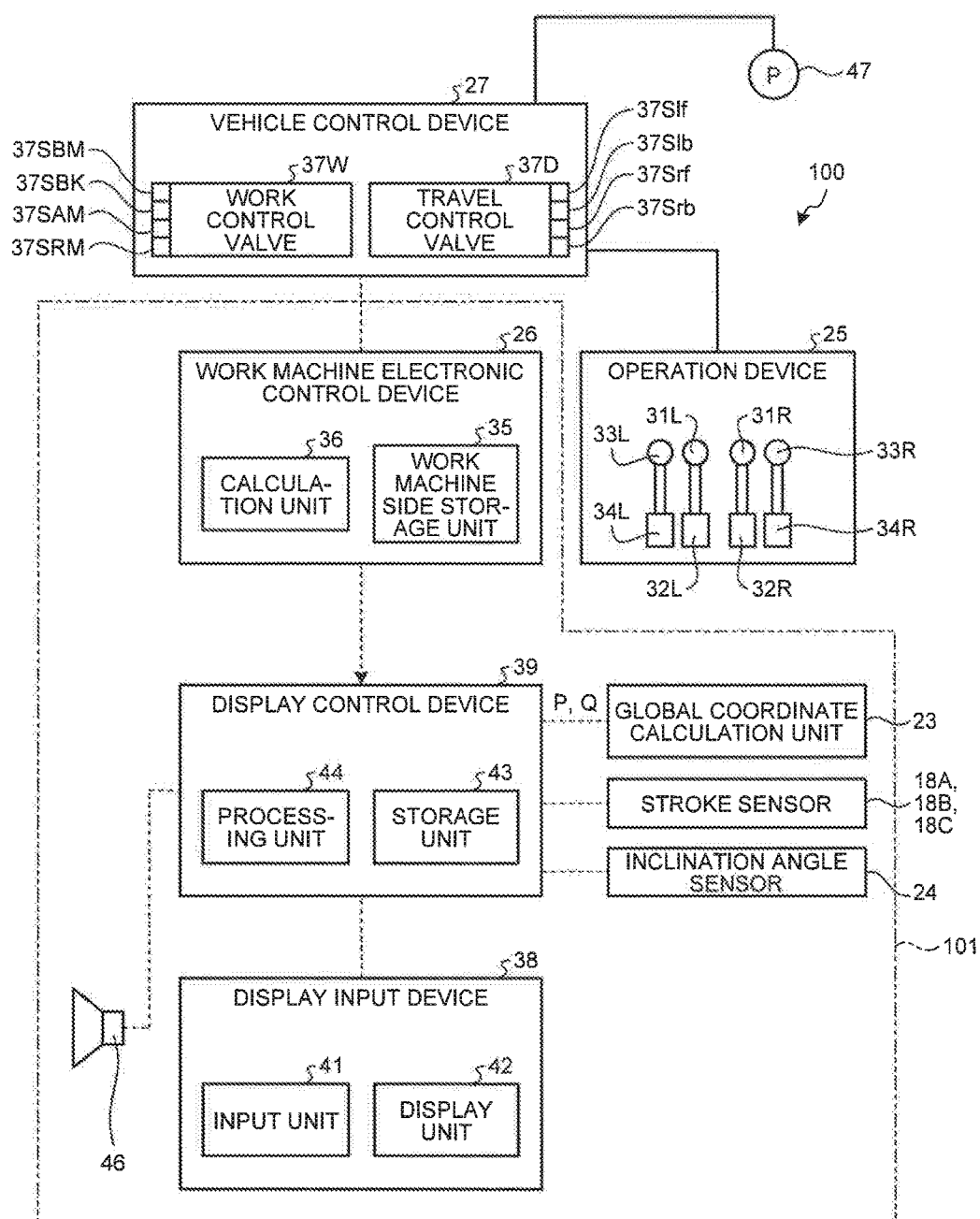
FIG. 4 is a block diagram illustrating a control system included in the excavator.
Figure 5:
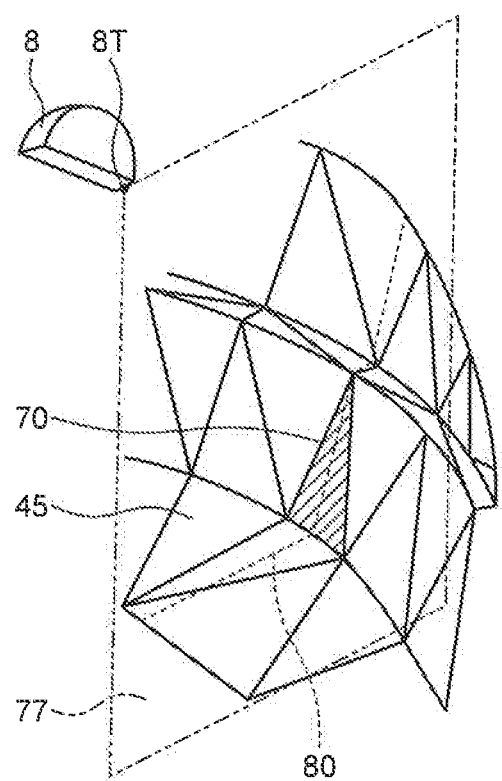
FIG. 5 is a view illustrating a design landform illustrated by design landform data.

FIG. 1 is a perspective view of an excavator 100 according to an embodiment. FIG. 2 is a side view of the excavator 100. FIG. 3 is a rear view of the excavator 100. FIG. 4 is a block diagram of a control system included in the excavator 100. FIG. 5 is a view illustrating a design landform illustrated by design landform data.

In this embodiment, the excavator 100 as an excavation machine includes a vehicle body 1 as a body portion and a work machine 2. The vehicle body 1 includes an upper swing body 3 as a swing body and a traveling apparatus 5. The upper swing body 3 accommodates devices such as a power generation device and a hydraulic pump (not illustrated) in a machine room 3EG. The machine room 3EG is disposed on one end side of the upper swing body 3.

In this embodiment, the excavator 100 includes an internal-combustion engine such as a diesel engine as the power generation device, but the excavator 100 is not limited thereto. The excavator 100 may include, for example, a so-called hybrid type power generation device in which an internal-combustion engine, a generator motor, and a power storage device are combined.

The upper swing body 3 includes an operator cab 4. The operator cab 4 is placed on the other end side of the upper swing body 3. That is, the operator cab 4 is disposed on the opposite side to the side where the machine room 3EG is disposed. In the operator cab 4, as illustrated in FIG. 4, a display input device 38 and an operation device 25 are disposed. These will be described later. Below the upper swing body 3, the traveling apparatus 5 is provided. The traveling apparatus 5 includes continuous tracks 5a and 5b. The traveling apparatus 5 travels as hydraulic motors 5c are driven and rotate the continuous tracks 5a and 5b such that the excavator 100 travels. The work machine 2 is mounted on the lateral side of the operator cab 4 of the upper swing body 3.

In addition, the excavator 100 may include a traveling apparatus which includes tires instead of the continuous tracks 5a and 5b and is capable of traveling by transmitting the driving force of a diesel engine (not illustrated) to the tires via a transmission. For example, this type of the excavator 100 may be a wheel-type excavator.

The side of the upper swing body 3 where the work machine 2 and the operator cab 4 are disposed is the front, and the side thereof where the machine room 3EG is disposed is the rear. The left side in the forward direction is the left of the upper swing body 3, and the right side in the forward direction is the right of the upper swing body 3. In addition, the traveling apparatus 5 side of the excavator 100 or the vehicle body 1 with respect to the upper swing body 3 is the downward side, and the upper swing body 3 side with respect to the traveling apparatus 5 is the upward side. In a case where the excavator 100 is installed on a horizontal plane, the downward direction is the vertical direction, that is, the direction in which the gravitational force is exerted, and the upward direction is the opposite direction to the vertical direction. Handrails 9 are provided on the upper swing body 3. As illustrated in FIG. 1, two antennas 21 and 22 for real time kinematic-global navigation satellite systems (RTK-GNSS, GNSS is referred to as a global navigation satellite system) (hereinafter, appropriately referred to as GNSS antennas 21 and 22) are detachably mounted on the handrail 9.

The work machine 2 includes a boom 6, an arm 7, a bucket 8, a boom cylinder 10, an arm cylinder 11, and a bucket cylinder 12. The base end portion of the boom 6 is rotatably mounted on the front portion of the vehicle body 1 via a boom pin 13. The base end portion of the arm 7 is rotatably mounted on the leading end portion of the boom 6 via an arm pin 14. The bucket 8 is mounted on the leading end portion of the arm 7 via a bucket pin 15.

The bucket 8 includes a plurality of teeth 8B. The plurality of teeth 8B are mounted on the end portion of the bucket 8 on the opposite side to the side where the bucket pin 15 is mounted, that is, the end portion of the bucket 8 which is farthest from the side where the bucket pin 15 is mounted. The plurality of teeth 8B are arranged in a single row in the direction parallel to the bucket pin 15. A cutting edges 8T are the leading end portions of the teeth 8B. The cutting edges 8T are the leading ends of the bucket 8 where the work machine 2 generates a digging force.

The bucket 8 is connected to the bucket cylinder 12 via a pin 16, and the bucket 8 rotates as the bucket cylinder 12 extends and retracts. That is, the bucket 8 rotates about the shaft perpendicular to the extension direction of the arm 7. The boom pin 13, the arm pin 14, and the bucket pin 15 are disposed in a positional relationship in which they are parallel to each other. That is, the center axes of the pins are in the positional relationship in which they are parallel to each other.

In addition, the term "perpendicular" mentioned hereinafter means a positional relationship in which two objects such as two lines (or axes), and a line (or an axis) and a surface or a surface and a surface are spatially perpendicular to each other. For example, in a case where a plane including one line (or axis) and a plane including the other line (or axis) are parallel to each other and the planes are viewed in a direction perpendicular to any plane of the planes, a state where one line and the other line are perpendicular to each other is also expressed by that one line and the other line are perpendicular to each other. Similarly, a state where a line (axis) and a surface are perpendicular to each other and a state where a surface and a surface are perpendicular to each other are also expressed by that they are perpendicular to each other.

As illustrated in FIG. 2, the length of the boom 6, that is, the length from the center axis line of the boom pin 13 to the center axis line of the arm pin 14 is denoted by L1. The length of the arm 7, that is, the length from the center axis line of the arm pin 14 to the center axis line AX1 of the bucket pin 15 is denoted by L2. The length of the bucket 8, that is, the length from the center axis line AX1 of the bucket pin 15 to the cutting edge 8T is denoted by L3. The length of the bucket 8 is the length along the axis line AX3 which is perpendicular to the center axis line AX1 of the bucket pin 15 and passes through the cutting edge 8T of the bucket 8.

The boom cylinder 10, the arm cylinder 11, and the bucket cylinder 12 illustrated in FIG. 1 are hydraulic cylinders which are operated by adjusting extension and retraction and the speed thereof according to the pressure (hereinafter, appropriately referred to as oil pressure) and the flow rate of operating oil. The boom cylinder 10 operates the boom 6, and causes the boom 6 to vertically rotate about the center axis of the boom pin 13. The arm cylinder 11 operates the arm 7, and causes the arm 7 to rotate about the center axis of the arm pin 14. The bucket cylinder 12 operates the bucket 8, and causes the bucket 8 to rotate about the center axis of the bucket pin 15. Between the hydraulic cylinder such as the boom cylinder 10, the arm cylinder 11, and the bucket cylinder 12 and a hydraulic pump 47 illustrated in FIG. 4, an work control valve 37W illustrated in FIG. 4 is disposed. A work machine electronic control device 26 which will be described later controls the work control valve 37W such that the flow rate of the operating oil supplied to the boom cylinder 10, the arm cylinder 11, and the bucket cylinder 12 is controlled. As a result, the operations of the boom cylinder 10, the arm cylinder 11, and the bucket cylinder 12 are controlled.

As illustrated in FIGS. 2 and 4, a first stroke sensor 18A, a second stroke sensor 18B, and a third stroke sensor 18C are respectively provided for the boom 6, the arm 7, and the bucket 8. The first stroke sensor 18A, the second stroke sensor 18B, and the third stroke sensor 18C are posture detection units which detects the postures of the work machine 2. The first stroke sensor 18A detects the stroke length of the boom cylinder 10.

A display control device 39 illustrated in FIG. 4 calculates an inclination angle θ1 of the boom 6 with respect to the Za axis of a vehicle body coordinate system, which will be described later, from the stroke length of the boom cylinder 10 detected by the first stroke sensor 18A. The second stroke sensor 18B detects the stroke length of the arm cylinder 11. The display control device 39 calculates an inclination angle θ2 of the arm 7 with respect to the boom 6 from the stroke length of the arm cylinder 11 detected by the second stroke sensor 18B. The third stroke sensor 18C detects the stroke length of the bucket cylinder 12. The display control device 39 calculates an inclination angle θ3 of the bucket 8 with respect to the arm 7 from the stroke length of the bucket cylinder 12 detected by the third stroke sensor 18C.

As illustrated in FIG. 2, the vehicle body 1 includes a positon detection unit 19. The positon detection unit 19 detects the current position of the excavator 100. The positon detection unit 19 includes the GNSS antennas 21 and 22, a global coordinate calculation unit 23, and an inclination angle sensor 24. The positon detection unit 19 may include a three-dimensional position sensor. The GNSS antennas 21 and 22 are installed in the vehicle body 1, more specifically, on the upper swing body 3. In this embodiment, the GNSS antennas 21 and 22 are provided, for example, to be separated from each other by a certain distance along the axis line parallel to the Ya axis of the vehicle body coordinate system [Xa, Ya, Za] illustrated in FIGS. 2 and 3.

The upper swing body 3 and the work machine 2 and the bucket 8 which are mounted thereon rotate about a predetermined swing center axis. The vehicle body coordinate system [Xa, Ya, Za] is the coordinate system of the vehicle body 1. In this embodiment, in the vehicle body coordinate system [Xa, Ya, Za], the swing center axis of the work machine 2 and the like is denoted by the Za axis, the axis which is perpendicular to the Za axis and is parallel to the operation plane of the work machine 2 is denoted by the Xa axis, and the axis perpendicular to the Za axis and the Xa axis is denoted by the Ya axis. The operation plane of the work machine 2 is, for example, a plane perpendicular to the boom pin 13. The Xa axis corresponds to the forward and rearward directions of the upper swing body 3, and the Ya axis corresponds to the width direction of the upper swing body 3.

It is preferable that the GNSS antennas 21 and 22 be provided on the upper swing body 3 and be installed at both end positions which are separated to each other in the forward and rearward directions (the direction of the Xa axis of the vehicle body coordinate system [Xa, Ya, Za] illustrated in FIGS. 2 and 3) or the right and left directions (the direction of the Ya axis of the vehicle body coordinate system [Xa, Ya, Za] illustrated in FIGS. 2 and 3) of the excavator 100. As described above, in this embodiment, as illustrated in FIG. 1, the GNS antennas 21 and 22 are mounted on the handrails 9 which are respectively mounted on both sides of the upper swing body 3 in the width direction. The positions of the upper swing body 3 at which the GNSS antennas 21 and 22 are mounted are not limited to the handrails 9. However, it is preferable that the GNSS antennas 21 and 22 be installed at positions which are separated from each other as much as possible to enhance the detection accuracy of the current position of the excavator 100. In addition, it is preferable that the GNSS antennas 21 and 22 be installed on positions which do not interfere with the visual field of an operator as much as possible. The GNSS antennas 21 and 22 may be provided on the upper swing body 3 and may be installed on a counter weight 3CW provided at the rear end of the upper swing body 3 illustrated in FIG. 1 or on the rear side of the operator cab 4.

Signals corresponding to GNSS radio waves received by the GNSS antennas 21 and 22 are input to the global coordinate calculation unit 23. The GNSS antenna 21 receives reference position data P1 indicating its own installation position from a positioning satellite. The GNSS antenna 22 receives reference position data P2 indicating its own installation position from the positioning satellite. The GNSS antennas 21 and 22 receive the reference position data P1 and P2, for example, at a period of 10 Hz. The reference position data P1 and P2 is information of the positions at which the GNSS antennas are installed. Whenever receiving the reference position data P1 and P2, the GNSS antennas 21 and 22 output the data to the global coordinate calculation unit 23.

The global coordinate calculation unit 23 acquires the two pieces of reference position data P1 and P2 (a plurality of pieces of reference position data) which are expressed by a global coordinate system. The global coordinate calculation unit 23 generates swing body disposition data indicating the disposition of the upper swing body 3 on the basis of the two pieces of reference position data P1 and P2. In this embodiment, the swing body disposition data includes one piece of reference position data P of the two pieces of reference position data P1 and P2 and swing body orientation data Q which is generated on the basis of the two pieces of reference position data P1 and P2. The swing body orientation data Q is determined on the basis of the angle between the orientation determined from the reference position data P acquired by the GNSS antennas 21 and 22 and the reference orientation (for example, the north) of the global coordinates. The swing body orientation data Q indicates the orientation to which the upper swing body 3, that is, the work machine 2 is directed. Whenever acquiring the two pieces of reference position data P1 and P2 from the GNSS antennas 21 and 22, for example, at a frequency of 10 Hz, the global coordinate calculation unit 23 updates the swing body disposition data, that is, the reference position data P and the swing body orientation data Q and outputs the data to the display control device 39.

As illustrated in FIG. 3, the inclination angle sensor 24 is mounted on the upper swing body 3. The inclination angle sensor 24 detects an inclination angle θ4 (hereinafter, appropriately referred to as a roll angle θ4) in the width direction of the vehicle body 1 with respect to the direction in which the gravitational force is exerted, that is, the vertical direction Ng. The inclination angle sensor 24 may be, for example, an inertial measurement unit (IMU). In this embodiment, the width direction of the bucket 8 is a direction parallel to the straight line which connects a plurality of cutting edges 8T. The width direction of the bucket 8 is coincident with the width direction of the upper swing body 3, that is, the right and left directions of the upper swing body 3. As described above, the positon detection unit 19 and the posture detection units as vehicle state detection units can detect the vehicle states including the current position and the posture of the excavation machine, that is, the excavator 100 in this embodiment.

As illustrated in FIG. 4, the excavator 100 includes the operation device 25, the work machine electronic control device 26, a vehicle control device 27, and a display system 101 of the excavation machine (hereinafter, appropriately referred to as a display system). The operation device 25 includes work machine operation members 31L and 31R and travel operation members 33L and 33R as operation units, work machine operation detection units 32L and 32R, and travel operation detection units 34L and 34R. In this embodiment, the work machine operation members 31L and 31R and the travel operation members 33L and 33R are pilot pressure type levers, but are not limited thereto. The work machine operation members 31L and 31R and the travel operation members 33L and 33R may also be, for example, electric levers. The work machine operation detection units 32L and 32R and the travel operation detection units 34L and 34R function as operation detection units which detect inputs to the work machine operation members 31L and 31R and the travel operation members 33L and 33R as the operation units.

The work machine operation members 31L and 31R are members for the operator to operate the work machine 2 or the upper swing body 3, and for example, are operation levers provided with a grip portion and a bar member such as a joy stick. The work machine operation members 31L and 31R having such structures can be tilted in the forward, rearward, right, and left directions with the grip portion being gripped. As illustrated in FIG. 4, the work machine operation detection units 32L and 32R respectively correspond to the work machine operation members 31L and 31R. On the right and left sides of an operator seat (not illustrated) in the operator cab 4, the work machine operation members 31L and 31R are installed. For example, the arm 7 and the upper swing body 3 can be operated by operating the work machine operation member 31L installed on the left side, and the bucket 8 and the boom 6 can be operated by operating the work machine operation member 31R installed on the right side.

The work machine operation detection units 32L and 32R generate a pilot pressure according to the inputs to the work machine operation members 31L and 31R, that is, the operation contents, and supply the generated pilot pressure of the operating oil to the work control valve 37W provided in the vehicle control device 27. According to the value of the pilot pressure, the work control valve 37W is operated such that the operating oil is supplied from the hydraulic pump (not illustrated) to the boom cylinder 10, the arm cylinder 11, the bucket cylinder 12, and the like illustrated in FIG. 1. In a case where the work machine operation members 31L and 31R are the electric levers, the work machine operation detection units 32L and 32R detect the inputs to the work machine operation members 31L and 31R, that is, the operation contents by using, for example, a potentiometer or the like, convert the inputs into electrical signals (detection signals), and send the signals to the work machine electronic control device 26. The work machine electronic control device 26 controls the work control valve 37W on the basis of the detection signals.

The travel operation members 33L and 33R are members for the operator to operate the travel of the excavator 100. The travel operation members 33L and 33R are, for example, operation levers (hereinafter, appropriately referred to as travel levers) provided with, for example, a grip portion and a bar member. The operator can tilt the travel operation members 33L and 33R in the forward and rearward directions while gripping the grip portion. When the two operation levers of the travel operation members 33L and 33R are simultaneously tilted in the forward direction, the excavator 100 moves forward, and when tilted in the rearward direction, the excavator 100 moves rearward. In addition, the travel operation members 33L and 33R are pedals (not illustrated) which can be operated by being pushed by the foot of the operator, and may be seesaw type pedals. The pilot pressure is generated by pushing any of the front side and the rear side of the pedal similarly to the above-described operation lever to control a travel control valve 37D such that the hydraulic motors 5c are driven and the excavator 100 can move forward or move rearward. When the front sides of the two pedals are simultaneously pushed, the excavator 100 moves forward, and when the rear sides thereof are pushed, the excavator 100 moves rearward. When the front side or the rear side of one pedal is pushed, only one of the continuous tracks 5a and 5b rotates to swing the excavator 100.

As described above, when the operator performs any one of tilting the operation levers in the forward and rearward directions with hands and pushing the front or rear sides of the pedals with feet in order to allow the excavator 100 to travel, the hydraulic motors 5c of the traveling apparatus 5 can be driven. As illustrated in FIG. 4, the travel operation detection units 34L and 34R respectively correspond to the travel operation members 33L and 33R. The travel operation members 33L and 33R are installed on the front side of the operator seat (not illustrated) in the operator cab 4 to be arranged in the right and left directions. By operating the travel operation member 33L installed on the left side, the hydraulic motor Sc on the left side illustrated in FIG. 1 is driven and the continuous track 5b on the left side can be operated. By operating the travel operation member 33R installed on the right side, the hydraulic motor 5c on the right side is driven and the continuous track 5a on the right side can be operated.

The travel operation detection units 34L and 34R generate a pilot pressure according to the inputs to the travel operation members 33L and 33R, that is, the operation contents, and supply the generated pilot pressure to the travel control valve 37D provided in the vehicle control device 27. According to the value of the pilot pressure, the travel control valve 37D is operated such that the operating oil is supplied to the travel hydraulic motors 5c illustrated in FIG. 1. In a case where the travel operation members 33L and 33R are the electric levers, the travel operation detection units 34L and 34R detect the inputs to the travel operation members 33L and 33R, that is, the operation contents by using, for example, a potentiometer or the like, and convert the inputs into electrical signals (detection signals), and send the signals to the work machine electronic control device 26. The work machine electronic control device 26 controls the travel control valve 37D on the basis of the detection signals.

As illustrated in FIG. 4, the work machine electronic control device 26 includes a work machine side storage unit 35 including at least one of random access memory (RAM) and read only memory (ROM) and a calculation unit 36 such as a central processing unit (CPU). The work machine electronic control device 26 mainly controls the operations of the work machine 2 and the upper swing body 3. In the work machine side storage unit 35, computer programs for controlling the work machine 2, computer programs for display of the excavation machine according to this embodiment, information of coordinates of the vehicle body coordinate system, and the like are stored. In the display system 101 illustrated in FIG. 4, the work machine electronic control device 26 and the display control device 39 are separated from each other, but are not limited to this form. For example, in the display system 101, the work machine electronic control device 26 and the display control device 39 are not separated from each other and may be an integrated control device.

The vehicle control device 27 is a hydraulic device provided with a hydraulic control valve and the like, and includes the travel control valve 37D and the work control valve 37W. These are proportional control valves and are controlled by the pilot pressure from the work machine operation detection units 32L and 32R and the travel operation detection units 34L and 34R. In a case where the work machine operation members 31L and 31R and the travel operation members 33L and 33R are the electric levers, the travel control valve 37D and the work control valve 37W are controlled on the basis of the control signal from the work machine electronic control device 26.

In a case where the travel operation members 33L and 33R are pilot pressure type travel levers, when the operator of the excavator 100 applies inputs thereto for the operations, the operating oil flows out from the travel control valve 37D at a flow rate corresponding to the pilot pressure from the travel operation detection units 34L and 34R and is supplied to the travel hydraulic motors 5c. When one or both of the travel operation members 33L and 33R are operated, one or both of the hydraulic motors 5c on the right and left sides illustrated in FIG. 1 are driven. As a result, at least one of the continuous tracks 5a and 5b rotates such that the excavator 100 travels forward and rearward or swings.

The vehicle control device 27 includes hydraulic sensors 37Slf, 37Slb, 37Srf, and 37Srb which detect the value of the pilot pressure supplied to the travel control valve 37D and generate the corresponding electrical signals. The hydraulic sensor 37Slf detects the pilot pressure for the left forward movement, the hydraulic sensor 37Slb detects the pilot pressure for the left rearward movement, the hydraulic sensor 37Srf detects the pilot pressure for the right frontward movement, and the hydraulic sensor 37Srb detects the pilot pressure for the right rearward movement. The work machine electronic control device 26 acquires the electrical signals that indicate the values of the pilot pressure of the operating oil, which are detected and generated by the hydraulic sensors 37Slf, 37Slb, 37Srf, and 37Srb. The electrical signals are used for the control of an engine or a hydraulic pump, an operation of a construction management device, which will be described later, and the like. As described above, in this embodiment, the work machine operation members 31L and 31R and the travel operation members 33L and 33R are the pilot pressure type levers. In this case, the hydraulic sensors 37Slf, 37Slb, 37Srf, and 37Srb and hydraulic sensors 37SBM, 37SBK, 37SAM, and 37SRM, which will be described later, function as operation detection units which detect the inputs to the work machine operation members 31L and 31R and the travel operation members 33L and 33R as the operation units.

In a case where the work machine operation members 31L and 31R are pilot pressure type operation levers, when the operator of the excavator 100 operates the operation levers, the operating oil flows out from the work control valve 37W at a flow rate corresponding to the pilot pressure generated according to the operations of the work machine operation members 31L and 31R. The operating oil which flows out from the work control valve 37W is supplied to at least one of the boom cylinder 10, the arm cylinder 11, the bucket cylinder 12, and a swing motor. In addition, regarding at least one of the boom cylinder 10, the arm cylinder 11, the bucket cylinder 12, and the swing motor, each cylinder is operated to extend and retract and the swing motor is driven to swing by the operating oil supplied from the work control valve 37W. As a result, at least one of the work machine 2 and the upper swing body 3 is operated.

The vehicle control device 27 includes the hydraulic sensors 37SBM, 37SBK, 37SAM, and 37SRM which detect the value of the pilot pressure supplied to the work control valve 37W and generate electrical signals. The hydraulic sensor 37SBM detects the pilot pressure corresponding to the boom cylinder 10, the hydraulic sensor 37SAM detects the pilot pressure corresponding to the arm cylinder 11, the hydraulic sensor 37SBK detects the pilot pressure corresponding to the bucket cylinder 12, and the hydraulic sensor 37SRM detects the pilot pressure corresponding to the swing motor. The work machine electronic control device 26 acquires the electrical signals that indicate the values of the pilot pressure, which are detected and generated by the hydraulic sensors 37SBM, 37SBK, 37SAM, and 37SRM. The electrical signals are used for the control of an engine, a hydraulic pump, and the like.

In this embodiment, the work machine operation members 31L and 31R and the travel operation members 33L and 33R are the pilot pressure type operation levers, but may also be the electric levers. In this case, the work machine electronic control device 26 generates a control signal for operating the work machine 2, the upper swing body 3, or the traveling apparatus 5 according to the operations of the work machine operation members 31L and 31R or the travel operation members 33L and 33R, and outputs the control signal to the vehicle control device 27.

The vehicle control device 27 controls the work control valve 37W and the travel control valve 37D on the basis of the control signal from the work machine electronic control device 26. The operating oil flows out from the work control valve 37W at a flow rate corresponding to the control signal from the work machine electronic control device 26, and is supplied to at least one of the boom cylinder 10, the arm cylinder 11, and the bucket cylinder 12. The boom cylinder 10, the arm cylinder 11, and the bucket cylinder 12 illustrated in FIG. 1 are driven by the operating oil supplied from the work control valve 37W. As a result, the work machine 2 is operated.

<Display System 101 of Excavation Machine>

The display system 101 of the excavation machine (hereinafter, appropriately referred to as a display system) is a system which provides information used for digging the ground surface in a work area by the excavator 100 to be constructed into a shape of a design surface, which will be described, for the operator. The display system 101 includes, in addition to the global coordinate calculation unit 23 and the inclination angle sensor 24 described above, stroke sensors including the first stroke sensor 18A, the second stroke sensor 18B, and the third stroke sensor 18C, the display input device 38 as a display device, the display control device 39, the work machine electronic control device 26, and a sound generation device 46 including a speaker for sounding the alarm. In addition, the display system 101 includes the positon detection unit 19 illustrated in FIG. 2. For the convenience, in FIG. 4, the global coordinate calculation unit 23 and the inclination angle sensor 24 in the positon detection unit 19 are illustrated, and the two antennas 21 and 22 are not presented.

The display input device 38 is a display device including an input unit 41 and a display unit 42. Examples of the input unit 41 include a button, a keyboard, a touch panel, and a combination thereof. Examples of the display unit 42 include a display panel such as a liquid crystal display (LCD) or an organic electro luminescence (EL) display. The display input device 38 displays a guide screen for providing information used for digging by using the work machine 2 for the operator. In addition, various keys are displayed on the guide screen. The operator can execute various functions of the display system 101 by coming into contact with the various keys on the guide screen. The guide screen will be described later.

The display control device 39 executes the various functions of the display system 101. The display control device 39 is an electronic control device including a storage unit 43 having at least one of RAM and ROM and a processing unit 44 such as a CPU. The storage unit 43 stores work machine data. The work machine data includes the length L1 of the boom 6, the length L2 of the arm 7, and the length L3 of the bucket 8 described above. In a case where the bucket 8 is replaced, the length L3 of the bucket 8 as the work machine data is a value corresponding to the dimensions of the bucket 8 to be replaced, and the value is input from the input unit 41 and stored in the storage unit 43. In addition, the work machine data includes the minimum value and the maximum value of each of the inclination angle θ1 of the boom 6, inclination angle θ2 of the arm 7, and the inclination angle θ3 of the bucket 8. The storage unit 43 stores computer programs for displaying images. The processing unit 44 reads and executes the computer programs for displaying images according to this embodiment, which are stored in the storage unit 43, so that the guide screen is displayed on the display unit 42, the information regarding the positional relationship between the work machine 2, the bucket 8, and a target construction surface and the like during the digging is displayed on the display unit 42, or posture information for guiding the operator of the excavator 100 to the operation of the bucket 8 is displayed on the display unit 42.

The display control device 39 and the work machine electronic control device 26 can communicate with each other via wireless or wired communication means. The storage unit 43 of the display control device 39 stores design landform data which is generated in advance. The design landform data is information regarding the shape and the position of a three-dimensional design landform, and is information of a design surface 45 illustrated in FIG. 5. The design landform shows a target shape of the ground surface which is a working object. The display control device 39 displays the guide screen on the display input device 38 on the basis of the design landform data and the information such as detection results from the various sensors described above. Specifically, as illustrated in FIG. 5, the design landform is constituted by a plurality of design surfaces 45 each of which is expressed by a triangular polygon. In addition, in FIG. 5, only one of the plurality of design surfaces 45 is denoted by reference numeral 45, and the reference numerals of the other design surfaces 45 are not presented. The working object is one or a plurality of the design surfaces 45. The operator selects the one or a plurality of the design surfaces 45 as a target construction surface 70. The target construction surface 70 is a surface to be dug from the plurality of design surfaces 45. The target construction surface 70 shows the target shape of a construction object. The target construction surface 70 is one or a plurality of the design surfaces 45, and the design surfaces 45 are specified by the design landform data stored in the storage unit 43. Accordingly, the storage unit 43 of the display control device 39 stores the information of the target construction surface 70. The display control device 39 displays the guide screen for informing the operator of the position of the target construction surface 70 on the display input device 38.

<Guide Screen>

FIGS. 6, 7-1, and 7-2 are views illustrating an example of the guide screen. The guide screen is a screen which shows the positional relationship between the target construction surface 70 and the cutting edge ST of the bucket 8 to guide the operator of the excavator 100 to the operation of the work machine 2 so as to form the ground surface, which is the working object, into the same shape as the target construction surface 70. As illustrated in FIGS. 6, 7-1, and 7-2, the guide screen includes a guide screen in a rough digging mode (hereinafter, appropriately referred to as a rough digging screen 53) and a guide screen in a fine digging mode (hereinafter, appropriately referred to as a fine digging screen 54).

(Example of Rough Digging Screen 53)

Figure 6:
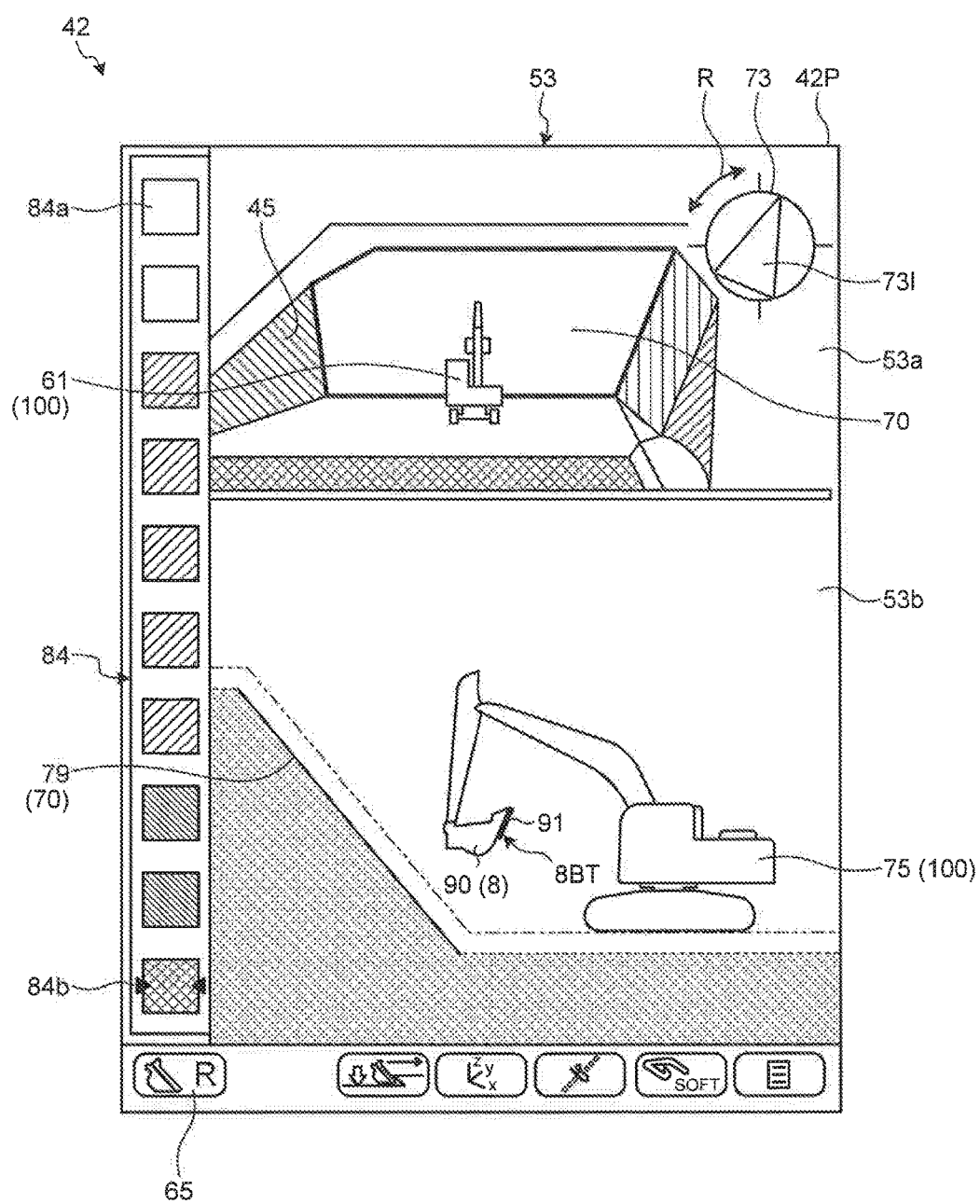
FIG. 6 is a view illustrating an example of a guide screen.

The rough digging screen 53 illustrated in FIG. 6 is displayed on a screen 42P of the display unit 42. The rough digging screen 53 includes a front view 53a which shows the design landform (the design surface 45 including the target construction surface 70) of the work area and the current position of the excavator 100, and a side view 53b which shows the positional relationship between the target construction surface 70 and the excavator 100. The front view 53a of the rough digging screen 53 illustrates the design landform viewed in the front view with a plurality of triangular polygons. As illustrated in the front view 53*a* of FIG. 6, the display control device 39 collects the plurality of triangular polygons to be displayed as the design surface 45 or the target construction surface 70 on the display unit 42. FIG. 6 illustrates a state where, in a case where the design landform is a slope, the excavator 100 faces the slope. Therefore, in the front view 53*a*, when the excavator 100 is tilted, the design surface 45 showing the design landform is also tilted. The front view 53*a* may display the design landform (the design surface 45 including the target construction surface 70) and the current position of the excavator 100 in a three-dimensional form like a bird's-eye view.

In addition, the target construction surface 70 which is selected as a target working object from the plurality of the design surfaces 45 (in FIG. 6, only one thereof is denoted by reference numeral) is displayed in a different color from the other design surfaces 45. In addition, in the front view 53*a* of FIG. 6, the current position of the excavator 100 is illustrated by an icon 61 illustrating the excavator 100 viewed in the rear view, and may also be illustrated by another symbol. In addition, the front view 53*a* includes information for causing the excavator 100 to face the target construction surface 70. The information for causing the excavator 100 to face the target construction surface 70 is displayed as a facing compass 73. The facing compass 73 is, for example, posture information including as a pattern or an icon in which an arrow-shaped pointer 73I rotates in a direction indicated by the arrow R for the guidance to a direction facing the target construction surface 70 and a direction in which the excavator 100 has to swing.

The posture information is information regarding the posture of the bucket 8 and includes patterns, numerical values, numbers, and the like. In order to cause the excavator 100 to face the target construction surface 70, the excavator 100 (the bucket 8) may be caused to face the target construction surface 70 by operating the excavator 100. For example, the operator may cause the excavator 100 (the bucket 8) to face the target construction surface 70 by operating the traveling apparatus 5 to move the excavator 100, or may cause the excavator 100 (the bucket 8) to face the target construction surface 70 by causing the upper swing body 3 to swing. The operator of the excavator 100 can check the degree of facing the target construction surface 70 using the facing compass 73. The facing compass 73 rotates according to the degree of facing the target construction surface 70, and when the excavator 100 or the bucket 8 faces the target construction surface 70, for example, a pointing direction of the pointer 73I viewed from the operator is directed to the upper side of the screen 42P. For example, in a case where the pointer 73I has a triangular shape as illustrated in FIG. 6, as the direction pointed by the apex of the triangle is closer to the upper side, the excavator 100 or the bucket 8 faces the target construction surface 70 more accurately. Therefore, the operator can easily cause the excavator 100 or the bucket 8 to face the target construction surface 70 by operating the excavator 100 on the basis of the rotation angle of the pointer 73I.

The side view 53*b* of the rough digging screen 53 includes an image illustrating the positional relationship between the target construction surface 70 and the cutting edge 8T of the bucket 8, and distance information indicating the distance between the target construction surface 70 and the cutting edge 8T of the bucket 8. Specifically, the side view 53*b* includes a target construction surface line 79, and an icon 75 of the excavator 100 viewed in the side view. The target construction surface line 79 shows the cross-section of the target construction surface 70. As illustrated in FIG. 5, the target construction surface line 79 is obtained by calculating a line 80 of intersection between a plane 77 which passes through the current position of the cutting edge 8T of the bucket 8 and the design surface 45. The line 80 of intersection is obtained by the processing unit 44 of the display control device 39.

In the side view 53*b*, the distance information indicating the distance between the target construction surface 70 and the cutting edge 8T of the bucket 8 includes graphic information 84. The distance between the target construction surface 70 and the cutting edge 8T of the bucket 8 is the distance between a point at which a line directed to the target construction surface 70 from the cutting edge 8T in the vertical direction (the direction of the gravitational force) intersects the target construction surface 70 and the cutting edge 8T. In addition, the distance between the target construction surface 70 and the cutting edge 8T of the bucket 8 may be the distance between a point of intersection formed when a line is drawn from the cutting edge 8T to be perpendicular to the target construction surface 70 and the cutting edge 8T. The perpendicular line drawn from the cutting edge 8T to the target construction surface 70 is perpendicular to the target construction surface 70.

The graphic information 84 is information indicating the distance between the cutting edge 8T of the bucket 8 and the target construction surface 70 using graphics. The graphic information 84 is a guide index showing the position of the cutting edge 8T of the bucket 8. Specifically, the graphic information 84 includes index bars 84*a*, and an index mark 84*b* indicating a position at which the distance between the cutting edge 8T of the bucket 8 and the target construction surface 70 is zero among the index bars 84*a*. The index bars 84*a* are formed as, for example, a plurality of partitioned blocks. The index bars 84*a* are formed so that each index bar 84*a* is turned on according to the minimum distance between the leading end of the bucket 8 and the target construction surface 70. In addition, On/Off of the display of the graphic information 84 may be changed as the operator of the excavator 100 operates the input unit 41.

In order to indicate the positional relationship between the target construction surface line 79 and the excavator 100 as described above, a distance (numerical value) (not illustrated) may be displayed on the rough digging screen 53. The operator of the excavator 100 can easily dig the current landform into the design landform by moving the cutting edge 8T of the bucket 8 along the target construction surface line 79. In addition, a screen switch key 65 for switching the guide screen is displayed on the rough digging screen 53. The operator can switch from the rough digging screen 53 to the fine digging screen 54 by operating the screen switch key 65.

(Example of Fine Digging Screen 54)

Figures 1, 7:
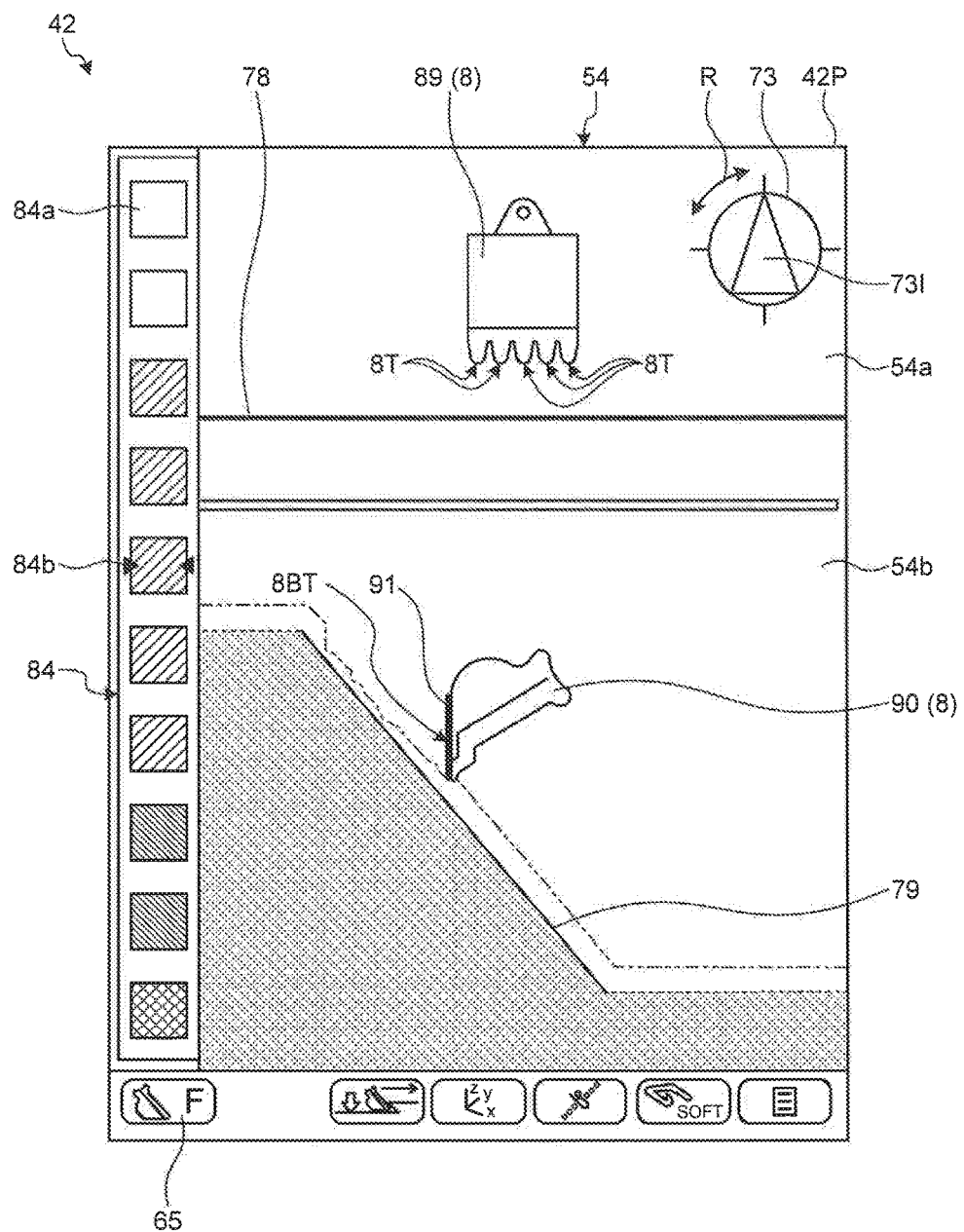
Figures 2, 7:
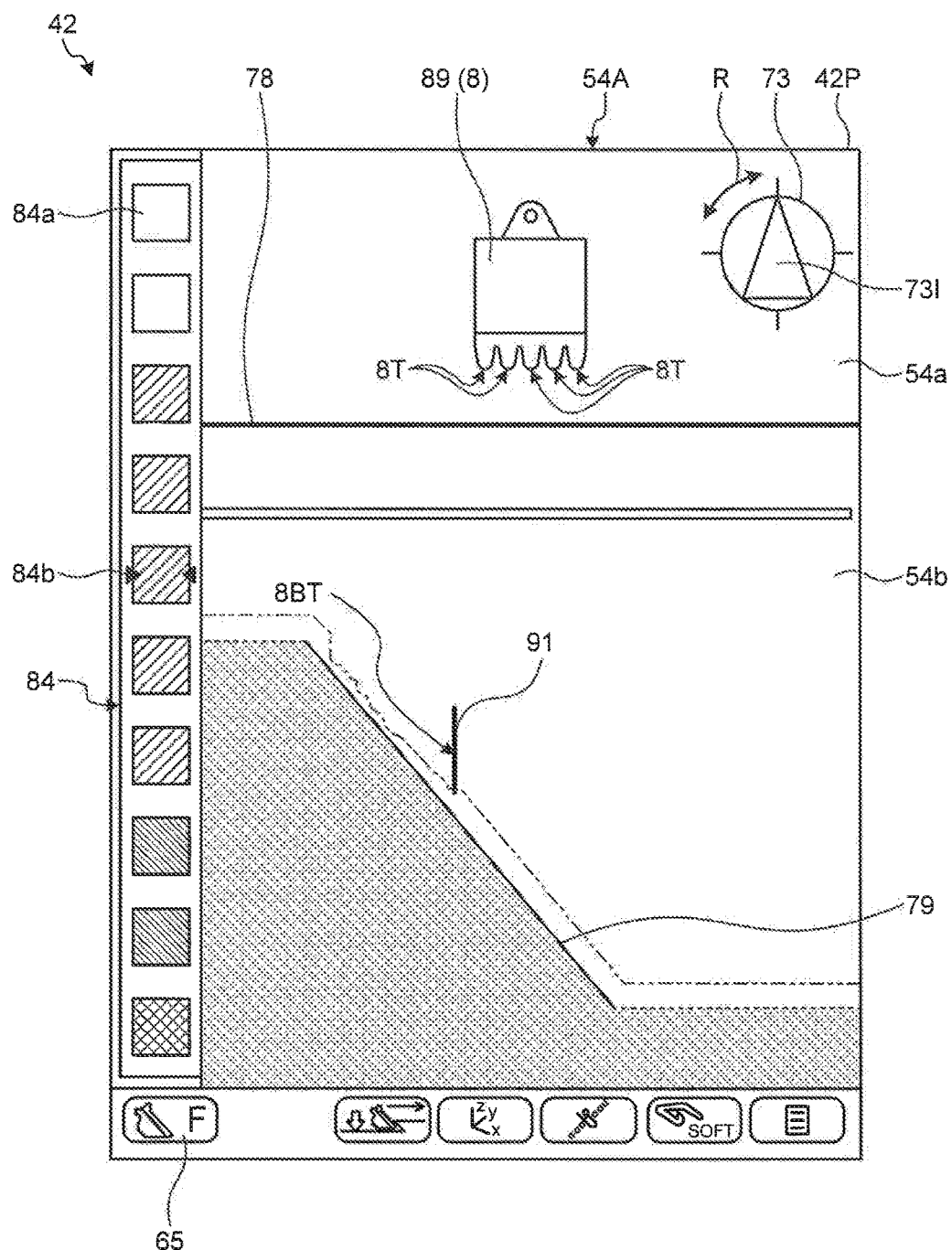

The fine digging screen 54 illustrated in FIG. 7-1 is displayed on the screen 42P of the display unit 42. The fine digging screen 54 displays a state where the cutting edge 8T of the bucket 8 faces the target construction surface 70 illustrated in FIG. 6. The fine digging screen 54 displays the positional relationship between the target construction surface 70 and the excavator 100 in more detail than the rough digging screen 53. That is, the fine digging screen 54 displays the positional relationship between the target construction surface 70 and the cutting edge 8T of the bucket 8 in more detail than the rough digging screen 53. The fine digging screen 54 includes a front view 54*a* illustrating the target construction surface 70 and the bucket 8, and a side view 54*b* illustrating the target construction surface 70 and the bucket 8. The front view 54*a* of the fine digging screen 54 includes an icon 89 illustrating the bucket 8 viewed in the front view, and a line 78 illustrating the cross-section of the target construction surface 70 viewed in the front view (hereinafter, appropriately referred to as a target construction surface line 78 viewed in the front view). The front view is viewing the bucket 8 from the rear of the excavator 100 in a direction perpendicular to the extension direction (the rotational center axis direction of the bucket 8) of the center axis of the bucket pin 15 illustrated in FIGS. 1 and 2.

The target construction surface line 78 in the front view can be obtained as follows. When a perpendicular line is drawn from the cutting edge 8T of the bucket 8 in the vertical direction (the direction of the gravitational force), the line of intersection between the plane including the perpendicular line and the target construction surface 70 is the target construction surface line 78 viewed in the front view. That is, the line of intersection is the target construction surface line 78 viewed in the front view in the global coordinate system. In addition, when a line is further drawn from the cutting edge 8T of the bucket 8 toward the target construction surface 70 under the condition of a positional relationship of being parallel to a vertical line of the vehicle body 1, the line of intersection between a plane including the line and the target construction surface 70 may be the target construction surface line 78 viewed in the front view. That is, the line of intersection is the target construction surface line 78 viewed in the front view in the vehicle body coordinate system. The operator can select any of the coordinate systems to display the target construction surface line 78 in the front view by operating a switch key (not illustrated) of the input unit 41.

The side view 54b of the fine digging screen 54 includes an icon 90 which is an image of the bucket 8 viewed from the side surface, that is, viewed in the side view of the bucket 8, and the target construction surface line 79. In the front view 54a and the side view 54b of the fine digging screen 54, information indicating the positional relationship between the target construction surface 70 and the bucket 8 as described later is displayed. The side view is viewing in the extension direction of the center axis of the bucket pin 15 illustrated in FIGS. 1 and 2, that is, the rotational center axis direction of the bucket 8, and viewing from one of the right and left sides of the excavator 100. In this embodiment, the side view refers to the case of viewing from the left side of the excavator 100.

The front view 54a may include distance information indicating the distance between the cutting edge 8T and the target construction surface 70 in the Za direction of the vehicle body coordinate system or in the Z direction of the global coordinate system as the information indicating the positional relationship between the target construction surface 70 and the bucket 8. The distance is the distance between a position closest to the target construction surface 70 among the positions in the width direction of the cutting edge 8T of the bucket 8 and the target construction surface 70. That is, as described above, the distance between the target construction surface 70 and the cutting edge 8T of the bucket 8 may be the distance between a point at which a line drawn from the cutting edge 8T in the vertical direction toward the target construction surface 70 intersects the target construction surface 70 and the cutting edge 8T. In addition, the distance between the target construction surface 70 and the cutting edge 8T of the bucket 8 may be the distance between a point at which a perpendicular line (the perpendicular line is perpendicular to the target construction surface 70) drawn from the cutting edge 8T to be perpendicular to the target construction surface 70 intersects the target construction surface 70 and the cutting edge 8T.

The fine digging screen 54 includes the graphic information 84 indicating the above-described distance between the cutting edge 8T of the bucket 8 and the target construction surface 70 using graphics. The graphic information 84 includes the index bars 84a and the index mark 84b similarly to the graphic information 84 of the rough digging screen 53. As described above, on the fine digging screen 54, the target construction surface line 78 in the front view and the relative positional relationship between the target construction surface line 79 and the cutting edge 8T of the bucket 8 are displayed in detail. The operator of the excavator 100 can further easily and accurately dig the current landform into the three-dimensional design landform by moving the cutting edge 8T of the bucket 8 along the target construction surface line 78 in the front view and the target construction surface line 79. In addition, the screen switch key 65 is displayed on the fine digging screen 54 similarly to the above-described rough digging screen 53. The operator can switch from the fine digging screen 54 to the rough digging screen 53 by operating the screen switch key 65.

(Straight Line Image 91 Indicating Bottom Surface 8BT of Bucket 8)

The display control device 39 performs an image display method according to this embodiment. Specifically, the display control device 39 displays a straight line image 91 indicating a bottom surface 8BT of the bucket 8 at a position corresponding to the bottom surface 8BT of the bucket 8 on at least one of the rough digging screen 53 and the fine digging screen 54 along with the icon 90 which is the image of the bucket 8 viewed in the side view. The straight line image 91 is an image corresponding to the bottom surface 8BT when the bucket 8 is viewed from the side surface. The straight line image 91 is displayed at the position corresponding to the bottom surface 8BT when the bucket 8 is viewed from the side surface in a different display form from the icon 90 which is the image of the bucket 8 viewed in the side view. That is, the straight line image 91 and the icon 90 which is the image of the bucket 8 viewed in the side view are displayed on the display unit 42 in the different display forms. For example, the straight line image 91 is displayed as a thicker line than the contour line of the icon 90, or the straight line image 91 is displayed as a different type of line or color from the contour line of the icon 90. The display control device 39 may display a screen including at least the straight line image 91 and the target construction surface 70 other than a screen displayed as the rough digging screen 53 or the fine digging screen 54 as illustrated in this embodiment. In this case, the display control device 39 may display the icon 90 which is the image of the bucket 8 viewed in the side view on the display unit 42 in addition to the images including the straight line image 91 and the target construction surface 70. In addition, the display control device 39 may display the image of the work machine 2 including the bucket 8 viewed in the side view on the display unit 42 in addition to the images including the straight line image 91 and the target construction surface 70. It is preferable that the display control device 39 display the images including at least the icon 75 of the excavator 100, the straight line image 91, and the target construction surface 70 viewed in the side view as illustrated in FIG. 6 on the display unit 42.

Since the straight line image 91 is displayed on at least one of the rough digging screen 53 and the fine digging screen 54 along with the target construction surface line 79 which is the image indicating the target construction surface 70, the operator of the excavator 100 can recognize the positional relationship between the target construction surface 70 and the bucket 8, more specifically, the positional relationship between the target construction surface 70 and the bottom surface 8BT of the bucket 8. Therefore, in the case of constructing the construction object along the target construction surface 70 by using the bottom surface 8BT of the bucket 8, the operator can intuitively and easily recognize the positional relationship between the two, that is, the parallelism between the bottom surface 8BT of the bucket 8 and the target construction surface 70. As a result, work efficiency in constructing the construction object along the target construction surface 70 by using the bottom surface 8BT of the bucket 8 is enhanced. Examples of the work of constructing the construction surface of the object by using the bottom surface 8BT of the bucket 8 include the work of flattening a construction surface by rolling work or leveling work, the work of molding a construction surface by slope work, and groove digging work for forming a groove.

On the fine digging screen 54 illustrated in FIG. 7-1, the straight line image 91 indicating the bottom surface 8BT of the bucket 8 is displayed at the position corresponding to the bottom surface 8BT of the bucket 8 along with the icon 90 which is the image of the bucket 8 viewed in the side view. However, as in a fine digging screen 54A illustrated in FIG. 7-2, only the straight line image 91 may be displayed, and the icon 90 may not be displayed. That is, the display control device 39 displays at least the straight line image 91 and the target construction surface line 79 on the screen 42P of the display unit 42.

<Generation of Straight Line Image 91>

Figure 8:
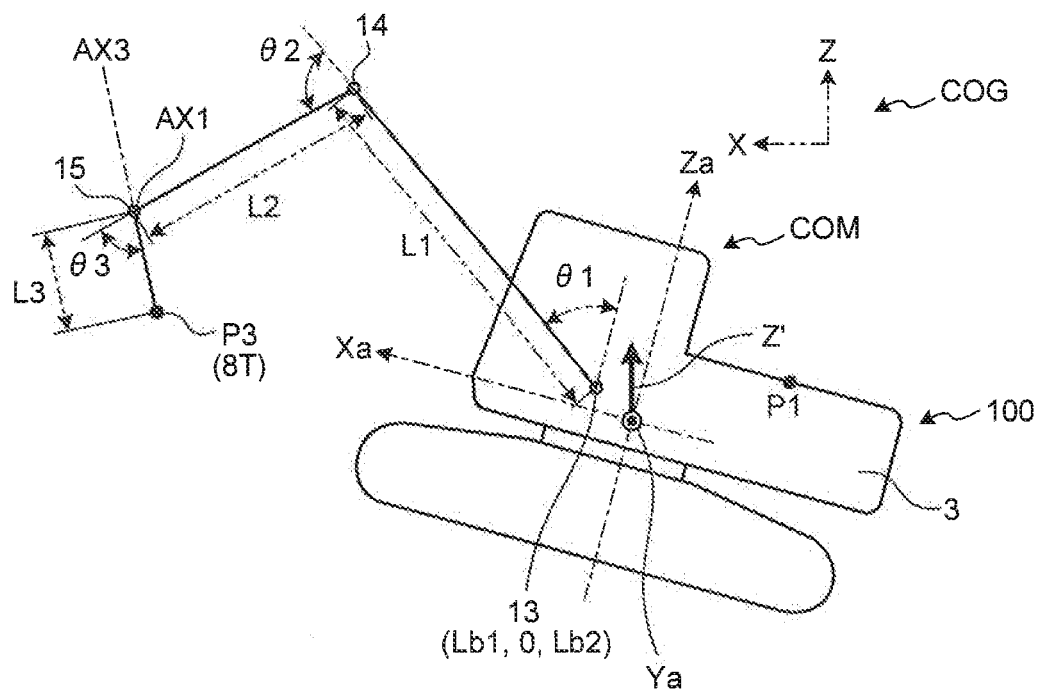
FIG. 8 is a view illustrating an example of a method of obtaining position information of a bucket when a straight line image is displayed on a display unit.
Figure 9:
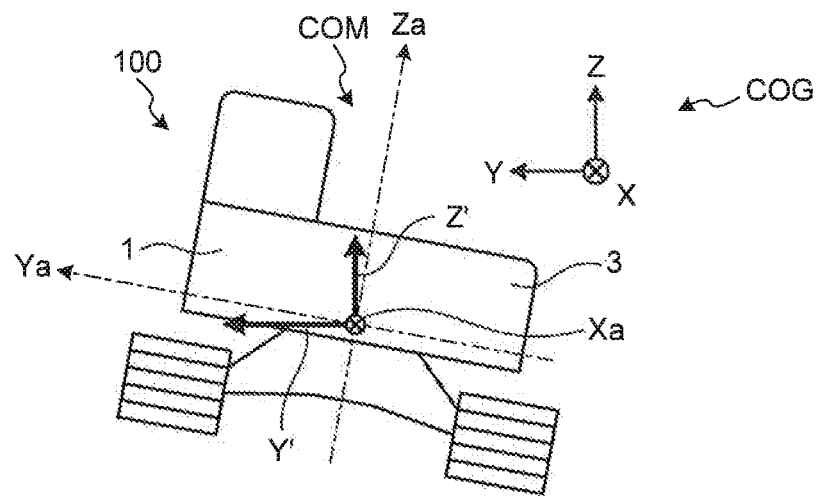
FIG. 9 is a view illustrating an example of the method of obtaining the position information of the bucket when the straight line image is displayed on the display unit.

FIGS. 8 and 9 are views illustrating an example of a method of obtaining position information of the bucket 8 when the straight line image 91 is displayed on the display unit 42. FIG. 8 is a side view of the excavator 100, and FIG. 9 is a rear view of the excavator 100. When the straight line image 91 is generated, the display control device 39 obtains the position of the cutting edge 8T of the bucket 8 (hereinafter, appropriately referred to as cutting edge position).

In this embodiment, the position information of the bucket 8 is information of the position of the cutting edge 8T. The cutting edge 8T of the bucket 8 is treated in a vehicle body coordinate system COM in this embodiment, and thus the information of the position of the cutting edge BT is, for example, the coordinates of the cutting edge 8T in the vehicle body coordinate system COM. As illustrated in FIG. 8, the display control device 39 positions the Za axis of the vehicle body coordinate system COM on the swing center axis of the upper swing body 3. In this example, the forward and rearward directions of the excavator 100, that is, the Xa axis direction of the vehicle body coordinate system COM is inclined with respect to the X axis of a global coordinate system COG. In addition, the coordinates of the boom pin 13 in the vehicle body coordinate system COM are (Lb1, 0, Lb2), and are stored in the storage unit 43 of the display control device 39 in advance. The Ya coordinate of the boom pin 13 may be a value other than 0.

The global coordinate calculation unit 23 illustrated in FIGS. 2 and 4 detects (calculates) the reference position data P1 and P2 of the GNSS antennas 21 and 22. The processing unit 44 acquires the coordinates of the detected reference position data P1 and P2 and calculates a unit vector in the Xa axis direction by using Expression (1). In Expression (1), P1 and P2 respectively represent the coordinates of the reference position data P1 and P2.

$$Xa = (P1-P2)/|P1-P2| \tag{1}$$

As illustrated in FIG. 8, when a vector Z' which passes through a plane containing two vectors, Xa and Za, and is spatially perpendicular to the vector Xa is introduced, the relationships of Expressions (2) and (3) are established. In Expression (3), c is an integer. From Expressions (2) and (3), Z' is expressed by Expression (4). Furthermore, when a vector perpendicular to Xa and Z' as illustrated in FIG. 9 is denoted by Y', Y' is expressed by Expression (5).

$$(Z',Xa)=0 \tag{2}$$

$$Z'=(1-c)\times Z+c\times Xa \tag{3}$$

$$Z'=Z+\{(Z,Xa)/((Z,Xa)-1)\}\times(Xa-Z) \tag{4}$$

$$Y'=Xa \perp Z' \tag{5}$$

As illustrated in FIG. 9, the vehicle body coordinate system COM is obtained by rotating the coordinate system [Xa, Y', Z'] about the Xa axis by the roll angle θ4 mentioned above, and thus is expressed by Expression (6).

$$[Xa \ Ya \ Za] = [Xa \ Y' \ Z'] \begin{bmatrix} 1 & 0 & 0 \\ 0 & \cos\theta 4 & \sin\theta 4 \\ 0 & -\sin\theta 4 & \cos\theta 4 \end{bmatrix} \tag{6}$$

The processing unit 44 acquires the detection results of the first stroke sensor 18A, the second stroke sensor 18B, and the third stroke sensor 18C, and obtains the current inclination angles θ1, θ2, and θ3 of the boom 6, the arm 7, and the bucket 8 described above by using the acquired detection results. The coordinates P3 (xa3, ya3, za3) of the cutting edge 8T of the bucket 8 in the vehicle body coordinate system COM can be obtained by Expressions (7), (8), and (9) by using the inclination angles θ1, θ2, and θ3 and the lengths L1, L2, and L3 of the boom 6, the arm 7, and the bucket 8. The coordinates P3 are the coordinates of the cutting edge 8T at the center of the bucket 8 in the width direction. The coordinates P3 are the position information of the bucket 8, and more specifically, are the position information of the cutting edge 8T. The processing unit 44 of the display control device 39 illustrated in FIG. 4 corresponds to a bucket position information generation unit which generates the position information of the bucket 8.

$$xa3=Lb1+L1\times\sin\theta1+L2\times\sin(\theta1+\theta2)+L3\times\sin(\theta1+\theta2+\theta3) \tag{7}$$

$$ya3=0 \tag{8}$$

$$za3=Lb2+L1\times\cos\theta1+L2\times\cos(\theta1+\theta2)+L3\times\cos(\theta1+\theta2+\theta3) \tag{9}$$

As illustrated in FIG. 5, the display control device 39 calculates the line 80 of intersection between the three-dimensional design landform and a plane which passes through the cutting edge 8T of the bucket 8 (hereinafter, appropriately referred to as the Ya-Za plane 77) by using the current position of the cutting edge 8T of the bucket 8 calculated as described above and the design landform data stored in the storage unit 43. The display control device 39 displays a part of the line 80 of intersection which passes through the target construction surface 70 as the target construction surface line 79 mentioned above on the guide screen.

Figure 10:
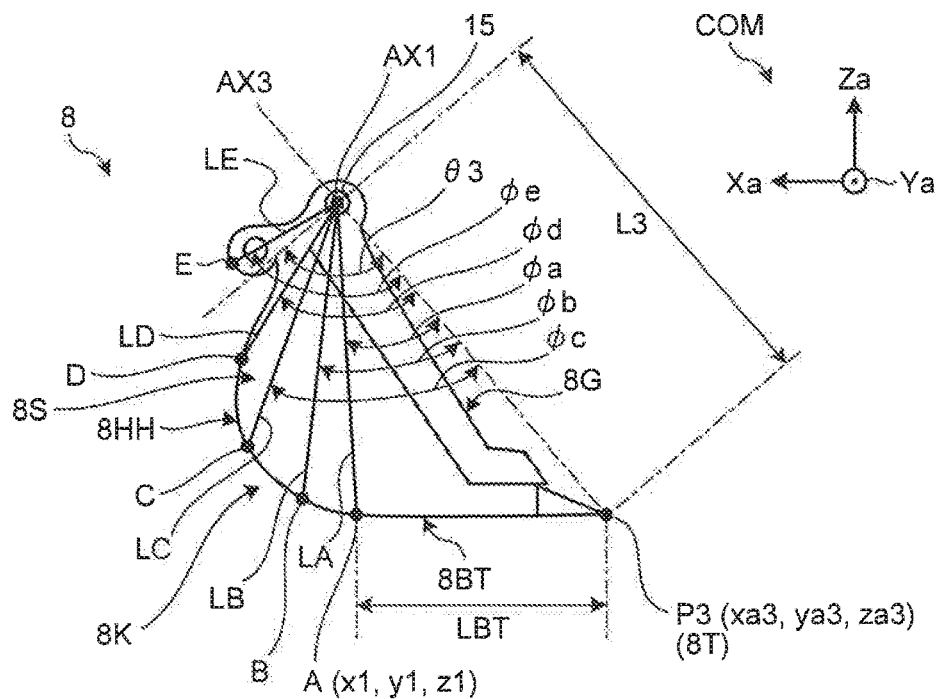
FIG. 10 is a side view illustrating information of the bucket needed to generate the straight line image.
Figure 11:
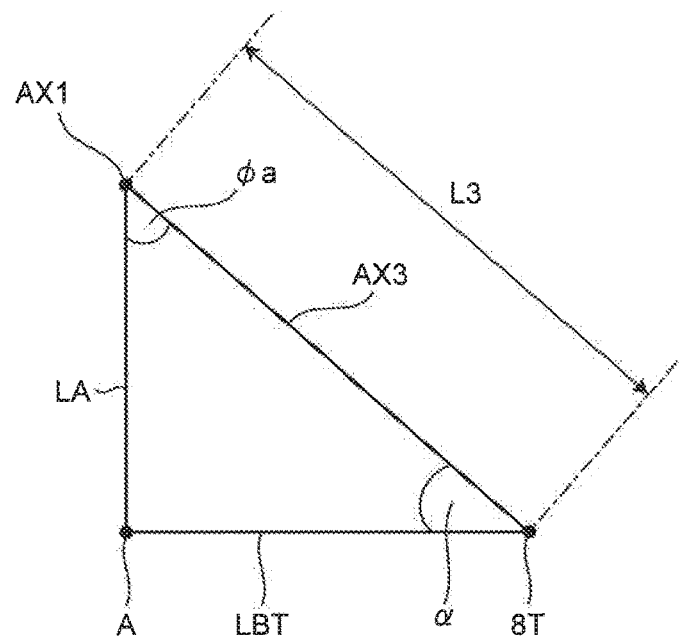
FIG. 11 is a view illustrating a method of obtaining a length of a bottom surface of the bucket.
Figure 12:
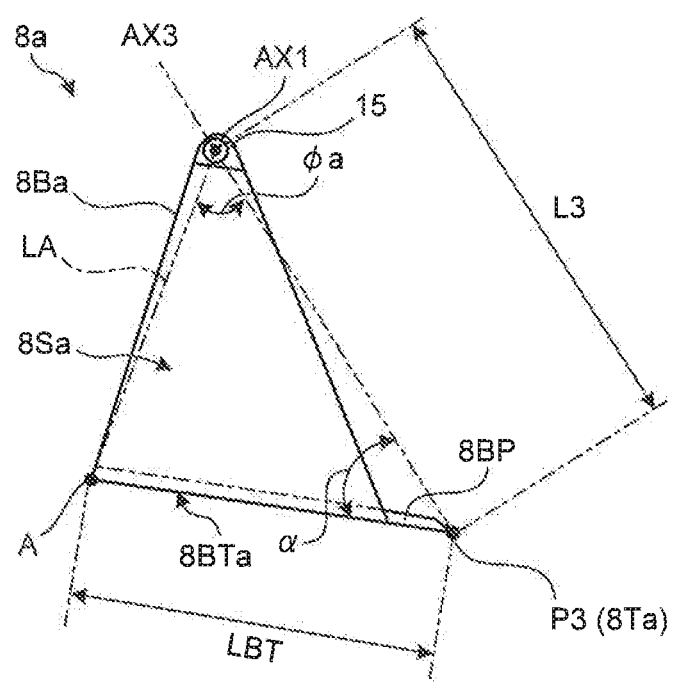
FIG. 12 is a side view illustrating information needed to generate the straight line image from a bucket for slope construction.

FIG. 10 is a side view illustrating the information of the bucket 8 needed to generate the straight line image 91. FIG. 11 is a view illustrating a method of obtaining a length LBT of the bottom surface 8BT of the bucket 8. FIG. 12 is a side view illustrating information indicating the information needed to generate the straight line image 91 from a bucket 8a for slope construction. As illustrated in FIG. 10, in the bucket 8, an outside 8K from the bucket pin 15 to the cutting edge 8T, that is, a portion that opposes an opening 8G protrudes outward. The bucket 8 includes a pair of side surfaces 8S which are provided to oppose each other in the width direction, and the outside 3K of the bucket 8 is joined to the pair of side surfaces 8S.

The outside of the bucket 8 includes a curved portion 8HH and the bottom surface 88T. The curved portion 8HH is a portion which reaches the cutting edge 8T from the bucket pin 15 and is formed to be curved. The bottom surface 8BT is a portion which reaches the bucket pin 15 from the cutting edge 8T and is formed to be flat. Therefore, when the bucket 8 is viewed from the side surface 8S side, the bottom surface 8BT is illustrated as a straight line. The boundary between the bottom surface 8BT and the curved portion 8HH is a position A. The curved portion 8HH is from the bucket pin 15 to the position A. The bottom surface 8BT is from the cutting edge 8T to the position A.

From the information of the dimensions of the bucket 8, the length LBT of the bottom surface 8BT and an angle α between the axis line AX3 illustrated in FIG. 11 and the bottom surface 8BT are obtained. The length LBT of the bottom surface 8BT is obtained by Expression (10), and the angle α is obtained by Expression (11). L3 is the length of the bucket 8, φa is the angle between the axis line AX3 which connects the center axis line AX1 and the cutting edge 8T and the line which connects the center axis line AX1 and the position A, and LA is the length between the center axis line AX1 and the position A. The angle φa and the LA are the information of the dimensions of the bucket 8.

$$LBT=\sqrt{\{L3^2+LA^2-2\times L3\times LA\times \cos(\varphi a)\}} \quad (10)$$

$$\alpha=a\cos\{(L3^2+LBT^2-LA^2)/(2\times L3\times LA)\} \quad (11)$$

Since the coordinates P3 (xa3, ya3, za3) of the cutting edge 8T are obtained by Expressions (7) to (9), a position of the length LBT from the cutting edge 8T in a direction inclined by the angle α with respect to the axis line AX3 is the position A in the vehicle body coordinate system COM. The processing unit 44 of the display control device 39 illustrated in FIG. 4 obtains a straight line which connects the coordinates P3 of the cutting edge 8T of the bucket 8 and the coordinates (x1, y1, z1) of the position A of the bucket 8, and displays the straight line as the straight line image 91 on the display unit 42. As described above, the straight line image 91 generated by using the position information of the bucket 8 and the information of the dimensions of the bucket 8 is generated by extracting the part corresponding to the bottom surface 8BT of the bucket 8.

In addition, the length of the straight line image 91 displayed on the display unit 42 may not be the length corresponding to the length LBT of the bottom surface 8BT of the bucket 3. For example, the straight line image 91 which is longer than the length LBT may be displayed on the display unit 42. For example, the straight line image 91 which extends toward the cutting edge 8T of the bucket 3 in the direction in which the straight line image 91 extends may be displayed. Otherwise, the straight line image 91 which extends toward the opposite side to the cutting edge 8T of the bucket 3 in the direction in which the straight line image 91 extends may be displayed. Since the straight line image 91 which is longer than the length LBT of the bottom surface 8BT of the bucket 3 is displayed on the display unit 42, the operator easily recognizes whether or not the bottom surface 8BT of the bucket 8 and the target construction surface 90 are parallel to each other.

In a case where the length of the straight line image 91 is longer than the length LBT of the bottom surface 8BT of the bucket 3, the processing unit 44 of the display control device 39 may display the part of the straight line image 91 which exceeds the length LBT of the bottom surface 8BT on the display unit 42 in a different display form from the part of the straight line image 91 corresponding to the bottom surface 8BT. In this case, the operator easily recognizes a part which is not actually included in the bottom surface 8BT of the bucket 8. For example, the processing unit 44 of the display control device 39 may display the part of the straight line image 91 which exceeds the length LBT of the bottom surface 8BT in a broken line and the part of the straight line image 91 corresponding to the bottom surface 8BT in a solid line, or may display the part of the straight line image 91 which exceeds the length LBT of the bottom surface 8BT and the part of the straight line image 91 corresponding to the bottom surface 8BT in different colors.

The storage unit 43 of the display control device 39 illustrated in FIG. 4 stores the information of the dimensions of the bucket 8. The information of the bucket 8 includes, for example, the bucket length L3, the lengths LA, LB, LC, LD, and LE from the center axis line AX1 to the positions A, B, C, D, and E, and the angles φa, φb, φc, φd, and φe. The angles φa, φb, φc, φd, and φe are angles between the axis line AX3 and the straight lines which respectively connect the center axis line AX1 and the positions A, B, C, D, and E. The positions A, B, C, D, and E are positions of the outside of the bucket 8, and thus the shape of the outside of the bucket 8 can be schematically recognized by the positions A, B, C, D, and E. Therefore, the lengths L3, LA, LB, LC, LD, and LE and the angles φa, φb, φc, φd, and φe are the information of the dimensions of the bucket 8, and are also the information indicating the shape of the bucket 8.

In the bucket 8a for slope construction illustrated in FIG. 12, a bottom plate 8BP which is a single flat plate is provided in the width direction of the bucket 8a, and is joined to a pair of side surfaces 8Sa which are disposed to oppose each other. Furthermore, the bucket 8a for slope construction includes a rear plate 8Ba which is joined to the end portion of the bottom plate 8BP (the end portion on the opposite side to a cutting edge 8Ta) and the end portions of the side surfaces 8Sa (the end portions on the opposite side to the opening side of the bucket 8a). In the bucket 8a for slope construction, the entire surface of the outside of the bottom plate 8BP is a bottom surface 8BTa. The end portion of the bottom plate 8BP on the bucket pin 15 side is a position A which is the boundary between the bottom surface 8BTa and the portion excluding the bottom surface 8BTa. In the bucket 8a for slope construction, similarly, the length from the cutting edge 8Ta to the position A is the length LBT of the bottom surface 8BTa. In the bucket 8a for slope construction, similarly to the bucket 8 illustrated in FIG. 10, the length LBT of the bottom surface 8BTa and the angle α between the axis line AX3 and the bottom surface 8BTa are obtained by using Expressions (10) and (11).

According to the above-described method, the processing unit 44 of the display control device 39 illustrated in FIG. 4 can generate the straight line image 91 from the coordinates P3 of the cutting edge position of the bucket 8 and the information of the shape and the dimensions of the bucket 8. Since the coordinates P3 of the cutting edge position of the bucket 8 are the coordinates of the cutting edge 8T at the center of the bucket 8 in the width direction, the straight line image 91 displays the bottom surface 8BT of the bucket 8 at the center of the bucket 8 in the width direction. In a case where the bottom surface 8BT which is not at the center in the width direction of the bucket 8 is to be used as the straight line image 91, the coordinates P3 of the cutting edge position of the bucket 8 may be obtained by using the shape of the cross-section of the bucket 8 to be displayed as the straight line image 91 and the Ya coordinate of the position of the cross-section in the Ya axis of the vehicle body coordinate system COM. The cross-section of the bucket 8 is a cross-section obtained when the bucket 8 is cut by a plane perpendicular to the center axis line AX1 of the bucket pin 15.

The straight line image 91 is displayed on the rough digging screen 53 illustrated in FIG. 6 or the fine digging screen 54 illustrated in FIG. 7-1 along with the target construction surface line 79. The straight line image 91 is expressed by the vehicle body coordinate system COM. The target construction surface line 79 is generated from the design surface 45 illustrated in FIG. 5, and the design surface 45 is generated from the design landform data which is the information regarding the shape and the position of the three-dimensional design landform. Since the design landform data is expressed by the global coordinate system, the processing unit 44 of the display control device 39 transforms the design landform data from the global coordinate system into the vehicle body coordinate system COM and then generates the target construction surface line 79 to be displayed on the rough digging screen 53 or on the fine digging screen 54.

The straight line image 91 has a different color from the icon 90 of the bucket 8. Accordingly, the visibility of the straight line image 91 is enhanced. The processing unit 44 of the display control device 39 can change the color of the straight line image 91 by the operation of the operator performed on the input unit 41. The processing unit 44 does not select color which is already used for the images displayed on the display unit 42, and selects unused color as the color of the straight line image 91. Furthermore, the processing unit 44 can change the thickness of the straight line image 91 or change the type of line such as a solid line or a broken line by the operation of the operator performed on the input unit 41.

The display control device 39 does not separately prepare or generate the image data of the icon 90 of the bucket 8 and the image data of the straight line image 91 to display both the image data to overlap each other, but may generate data in which the icon 90 of the bucket 8 and the straight line image 91 are integrated with each other to display the generated data on the display unit 42. In any case, the display control device 39 may display the straight line image 91 indicating the part corresponding to the bottom surface 8BT when the bucket 8 is viewed from the side surface and display the image of the bucket 8 of the part excluding the part corresponding to the bottom surface 8BT in a different display form from the straight line image 91, on the display unit 42.

First Modification Example

The processing unit 44 of the display control device 39 may change the display form of the straight line image 91 before and after the straight line image 91 and the target construction surface line 79 corresponding to the target construction surface 70 are parallel to each other. In this case, the operator of the excavator 100 easily recognizes that the bottom surface 8BT of the bucket 8 and the target construction surface 70 are parallel to each other, and thus the construction of the target construction surface 70 using the bottom surface 8BT of the bucket 8 is facilitated. Examples of changing the display form of the straight line image 91 before and after the straight line image 91 and the target construction surface line 79 corresponding to the target construction surface 70 are parallel to each other include changing the color of the straight line image 91, changing the straight line image 91 from a blinking state to a turned-on state or from the turned-on state to the blinking state, changing the thickness of the straight line image 91, and a combination of at least two thereof. As an example, the display control device 39 may display the straight line image 91 in red on the display unit 42 before the straight line image 91 and the target construction surface line 79 corresponding to the target construction surface 70 are parallel to each other, and display the straight line image 91 in blue after the two are parallel to each other on the display unit 42.

The straight line image 91 is inclined by the angle α with respect to the axis line AX3 illustrated in FIG. 11. Therefore, the straight line image 91 is inclined by degrees of (θ1+θ2+θ3−180+α) with respect to the Za axis of the vehicle body coordinate system COM illustrated in FIG. 8. Since the target construction surface line 79 is expressed by the vehicle body coordinate system COM, the inclination angle with respect to the Za axis of the vehicle body coordinate system COM is obtained. Accordingly, the processing unit 44 can obtain the angle between the straight line image 91 and the target construction surface line 79. In this modification embodiment, the processing unit 44 determines that the straight line image 91 and the target construction surface line 79 are parallel to each other when the angle between the straight line image 91 and the target construction surface line 79 is 0 or equal to or less than a predetermined threshold.

When the straight line image 91 and the target construction surface line 79 are parallel to each other, for example, the processing unit 44 of the display control device 39 may cause the sound generation device 46 illustrated in FIG. 4 to generate a sound to inform the operator that the bottom surface 8BT of the bucket 8 and the target construction surface 70 are parallel to each other. In this case, the operator can recognize that the bottom surface 8BT of the bucket 8 and the target construction surface 70 are parallel to each other from any one or both of the image and the sound. In this modification example, in the case of informing the operator that the bottom surface 8BT of the bucket 8 and the target construction surface 70 are parallel to each other, the display control device 39 may use both the changing of the display form and the informing by the sound, or may use any one of the two.

Second Modification Example

The processing unit 44 of the display control device 39 may change the display form of the straight line image 91 according to the angle between the bottom surface 8BT of the bucket 8 and the target construction surface 70. In this case, the operator of the excavator 100 easily recognizes the change in the relative positional relationship between the bottom surface 8BT of the bucket 8 and the target construction surface 70, and thus the construction of the target construction surface 70 using the bottom surface 8BT of the bucket 8 is facilitated. An example of changing the display form of the straight line image 91 and a method of obtaining the angle between the straight line image 91 and the target construction surface line 79 are the same as those described in the first modification example. The processing unit 44 may continuously change or may change in stages the display form of the straight line image 91 as the angle between the bottom surface 8BT of the bucket 8 and the target construction surface 70 is changed. Example of continuously changing the display form of the straight line image 91 may include gradually changing the color of the straight line image 91 to a different color and gradually changing the brightness of the color of the straight line image 91. As an example, the display control device 39 displays the red straight line image 91 on the display unit 42 in a case where the angle between the bottom surface 8BT of the bucket 8 and the target construction surface 70 is equal to or higher than the predetermined threshold, and displays the blue straight line image 91 on the display unit 42 in a case where the angle between the two is less than the predetermined threshold.

Third Modification Example

The processing unit 44 of the display control device 39 may change the display form of the straight line image 91 according to the distance between the bottom surface 8BT of the bucket 8 and the target construction surface 70. Even in this case, the operator of the excavator 100 easily recognizes the change in the relative positional relationship between the bottom surface 8BT of the bucket 8 and the target construction surface 70, and thus the construction of the target construction surface 70 using the bottom surface 8BT of the bucket 8 is facilitated. As an example, the display control device 39 displays the red straight line image 91 on the display unit 42 in a case where the distance between the bottom surface 8BT of the bucket 8 and the target construction surface 70 is equal to or higher than a predetermined threshold, and displays the blue straight line image 91 on the display unit 42 in a case where the distance between the two is less than the predetermined threshold. For example, the distance between the straight line image 91 and the target construction surface line 79 may be obtained by using the part of the straight line image 91 corresponding to the cutting edge 8T of the bucket 8 as a reference. In addition, the minimum distance between the straight line image 91 and the target construction surface line 79 may be used as the distance between the straight line image 91 and the target construction surface line 79. An example of changing the display form of the straight line image 91 is the same as those of the first and second modification examples.

Fourth Modification Example

The processing unit 44 of the display control device 39 may display a menu image regarding the display of the straight line image 91 on the display unit 42 to allow the operator to switch between the display and the non-display of the straight line image 91 by operating the input unit 41. In this case, the input unit 41 corresponds to a display switch device. In this case, for example, the operator can switch between the display and the non-display of the straight line image 91 according to a work mode of the excavator 100. As an example, by the operation of the operator, the straight line image 91 is set to be not displayed in a heavy digging mode, and the straight line image 91 is set to be displayed in a work mode in which the construction surface of an object is constructed by using the bottom surface 8BT of the bucket 8. In this modification example, in a case where the positional relationship between the bottom surface 8BT of the bucket 8 and the target construction surface 70 is unnecessary, the straight line image 91 is set to be not displayed, and thus a burden on the processing unit 44 can be reduced.

As described above, in the embodiment and the modification examples thereof, the image of the bucket 8 when viewed from the side surface and the image of the target construction surface 70 are displayed on the display unit 42, and the straight line image 91 is generated by extracting the part corresponding to the bottom surface 8BT when the bucket 8 is viewed from the side surface using the position information of the bucket 8 and the information of the shape of the bucket 8 so that the straight line image 91 is displayed at the position corresponding to the bottom surface 8BT on the display unit 42. Therefore, the operator can intuitively and easily recognize the positional relationship between the bottom surface 8BT of the bucket 8 and the target construction surface 70, and thus work efficiency is enhanced when the work of constructing the target construction surface 70 by using the bottom surface 8BT of the bucket 8 is performed. As such, in the embodiment and the modification examples thereof, when the operator of the excavator 100 which is the excavation machine conducts construction, the information regarding the construction state can be provided for the operator to be easily understandable. Particularly, the embodiment and the modification examples thereof are effective in the case of constructing the construction object by using the bottom surface 8BT of the bucket 8.

In a case where the shape of the bucket 8 is accurately reproduced and displayed on the display unit 42, the burden on the processing unit 44 of the display control device 39 is increased, and thus a huge amount of information for accurately reproducing the shape of the bucket 8 needs to be stored in the storage unit 43. As such, when the shape of the bucket 8 is accurately reproduced, a burden on hardware resources is increased. In the embodiment and the modification examples thereof, since the burden on the processing unit 44 is reduced by using the straight line image 91 and thus there is no need to accurately reproduce the shape of the bucket 8, the amount of the information stored in the storage unit 43 is less than that in a case where the shape of the bucket 8 is accurately reproduced. As described above, in the embodiment and the modification examples thereof, in a case where the relationship between the bottom surface 8BT of the bucket 8 and the target construction surface is displayed on the display unit 42 to be recognized by the operator, the burden on the hardware resources can be reduced.

The embodiment and the modification examples thereof are not limited to the above description. In addition, the above-described constituent elements include those in a so-called equivalent range including those that can be easily postulated by those skilled in the art and those that are substantially the same. Furthermore, the above-described constituent elements can be appropriately combined. Moreover, various omissions, substitutions, and changes can be made without departing from the gist of the embodiment and the modification examples thereof.

For example, the contents of each guide screen are not limited to the above description and may also be appropriately modified. A part or all of the functions of the display control device 39 may be executed by a computer disposed outside the excavator 100. In addition, the target working object is not limited to the flat surface described above, and may also be a point, a line, or a three-dimensional shape. The input unit 41 of the display input device 38 is not limited to the touch panel type, may also be formed by an operation member such as a hard key or a switch.

In the embodiment and the modification examples thereof, the work machine 2 includes the boom 6, the arm 7, and the bucket 8. However, the work machine 2 is not limited thereto, and may include at least the bucket 8. In addition, in the above-described embodiment, as the first stroke sensor 18A, the second stroke sensor 18B, and the third stroke sensor 18C respectively detect the stroke lengths of the hydraulic cylinders, the postures of the boom 6, the arm 7, and the bucket 8 are detected. However, the posture detection unit is not limited thereto. For example, angle sensors which detect the inclination angles of the boom 6, the arm 7, and the bucket 8 may also be provided.

In the embodiment and the modification examples thereof, the bucket 8 is provided. However, the bucket is not limited thereto and may be a tilt bucket. The tilt bucket is a bucket which includes a tilt cylinder and thus can form and level a slope surface and a flatland into a free form by tilting the bucket to the right and the left even when the excavator is on a slope land such that a rolling work can be performed using a bottom plate. In the case of the tilt bucket, for example, a part of the bottom surface which is closest to the target construction surface 70 in the width direction can be displayed as the straight line image 91 on the display unit 42.

REFERENCE SIGNS LIST

1 VEHICLE BODY
2 WORK MACHINE
3 UPPER SWING BODY
6 BOOM
7 ARM
8, 8a BUCKET
8B TEETH
8G OPENING
8HH CURVED PORTION
8K OUTSIDE
8T, 8Ta CUTTING EDGE
8S, 8Sa SIDE SURFACE
8BP BOTTOM PLATE
8BT, 8BTa BOTTOM SURFACE
19 POSITON DETECTION UNIT
21, 22 ANTENNA
23 GLOBAL COORDINATE CALCULATION UNIT
24 INCLINATION ANGLE SENSOR
25 OPERATION DEVICE
26 WORK MACHINE ELECTRONIC CONTROL DEVICE
27 VEHICLE CONTROL DEVICE
35 WORK MACHINE SIDE STORAGE UNIT
36 CALCULATION UNIT
38 DISPLAY INPUT DEVICE
39 DISPLAY CONTROL DEVICE
43 STORAGE UNIT
44 PROCESSING UNIT
45 DESIGN SURFACE
70 TARGET CONSTRUCTION SURFACE
79 TARGET CONSTRUCTION SURFACE LINE
90 ICON
91 STRAIGHT LINE IMAGE
100 EXCAVATOR
101 DISPLAY SYSTEM
P3 COORDINATES

The invention claimed is:

1. A display system of an excavation machine including a work machine having a bucket, the display system of the excavation machine comprising:

a storage unit which stores information of a dimension of the bucket and information of a target construction surface indicating a target shape of a construction object;

a display unit which displays an image of the target construction surface on a screen; and a processing unit which displays, on the display unit, a part corresponding to a contour of a bottom surface of the bucket of a contour of the bucket viewed from a side surface, in a different display form from the contour other than the contour of the bottom surface of the bucket, along with the contour of a part of other than the bottom surface of the bucket and the image of the target construction surface.

2. The display system of an excavation machine according to claim 1, wherein an image indicating a part corresponding to a contour of the bottom surface of the bucket is a straight line image, and the processing unit generates an image of the contour of the bucket separately from the straight line image, and displays the image of the contour of the bucket in a different display form from the straight line image on the display unit along with the straight line image.

3. The display system of an excavation machine according to claim 1, wherein an image indicating a part corresponding to a contour of the bottom surface of the bucket is a straight line image, and the processing unit changes a display form of the straight line image before and after the bottom surface of the bucket and the target construction surface are parallel to each other.

4. The display system of an excavation machine according to claim 1, wherein an image indicating a part corresponding to a contour of the bottom surface of the bucket is a straight line image, and the processing unit changes a display form of the straight line image according to an angle between the bottom surface of the bucket and the target construction surface.

5. The display system of an excavation machine according to claim 1, wherein an image indicating a part corresponding to a contour of the bottom surface of the bucket is a straight line image, and the processing unit changes a display form of the straight line image according to a distance between the bottom surface of the bucket and the target construction surface.

6. An excavation machine comprising:
the display system of an excavation machine according to claim 1.

7. An image display method comprising:
when an image is displayed on a display unit of an excavation machine which includes a work machine having a bucket and the display unit which displays at least an image of a target construction surface indicating a target shape of a construction object on a screen,
displaying the image of the target construction surface on the display unit; and
displaying, on the display unit, a part corresponding to a contour of a bottom surface of the bucket of a contour of the bucket viewed from a side surface, in a different display form from the contour other than the contour of the bottom surface of the bucket, along with the contour of a part of other than the bottom surface of the bucket and the image of the target construction surface.

8. The display system of an excavation machine according to claim 1, further comprising
a plurality of sensors which detects postures of the work machine; and
a bucket position information generation unit which further generates position information of the bucket by using detection results of the sensors,
wherein the processing unit displays, on the display unit, the part corresponding to the contour of the bottom surface of the bucket of the contour of the bucket viewed from the side surface, by using the generated position information of the bucket, in the different display form from the contour other than the contour of the bottom surface of the bucket, along with the contour of the part of other than the bottom surface of the bucket and the image of the target construction surface.

9. A display system of an excavation machine including a work machine having a bucket, the display system of the excavation machine comprising:
a bucket position information generation unit which generates position information of a cutting edge of the bucket;
a storage unit which stores information of a dimension of the bucket and information of a target construction surface indicating a target shape of a construction object;
a display unit which displays an image of the bucket and an image of the target construction surface on a screen;
a processing unit which, on the display unit, by using the position information of the bucket and the information of the dimension of the bucket, displays a part corresponding to a contour of a bottom surface of the bucket of a contour of the bucket viewed from a side surface, in a different display form from the contour other than the contour of the bottom surface of the bucket, along with the contour of a part of other than the bottom surface of the bucket and the image of the target construction surface; and
a display switch device which switches between display and non-display of the straight line image,
wherein an image indicating a part corresponding to a contour of the bottom surface of the bucket is a straight line image.

10. A display system of an excavation machine including a work machine having a bucket, the display system of the excavation machine comprising:
a bucket position information generation unit which generates position information of the bucket;
a storage unit which stores information of a dimension of the bucket and information of a target construction surface indicating a target shape of a construction object;
a display unit which displays an image of the target construction surface on a screen; and
a processing unit which, on the display unit, displays a part corresponding to a contour of a bottom surface of the bucket of a contour of the bucket viewed from a side surface, in a different display form from the contour other than the contour of the bottom surface of the bucket, along with the image of the target construction surface and the contour of a part of other than the bottom surface of the bucket which excludes the part corresponding to the bottom surface of the bucket,
wherein an image indicating a part corresponding to a contour of the bottom surface of the bucket is a straight line image.

11. A display system of an excavation machine including a work machine having a bucket, the display system of the excavation machine comprising:
a bucket position information generation unit which generates position information of the bucket;
a storage unit which stores information of a dimension of the bucket and information of a target construction surface indicating a target shape of a construction object;
a display unit which displays an image of the target construction surface on a screen; and
a processing unit which, on the display unit, displays a part corresponding to a contour of a bottom surface of the bucket of a contour of the bucket viewed from a side surface, in a different display form from the contour other than the contour of the bottom surface of the bucket, along with the contour of a part of other than the bottom surface of the bucket and the image of the target construction surface,
wherein an image indicating a part corresponding to a contour of the bottom surface of the bucket is a straight line image which is generated by extracting the part corresponding to the bottom surface of the bucket, and the processing unit changes a display form of the straight line image before and after the bottom surface of the bucket and the target construction surface are parallel to each other.

12. A display system of an excavation machine including a work machine having a bucket, the display system of the excavation machine comprising:
a bucket position information generation unit which generates position information of the bucket;
a storage unit which stores information of a dimension of the bucket and information of a target construction surface indicating a target shape of a construction object;
a display unit which displays an image of the target construction surface on a screen; and
a processing unit which, on the display unit, displays a part corresponding to a contour of a bottom surface of the bucket of a contour of the bucket viewed from a side surface, in a different display form from the contour other than the contour of the bottom surface of the bucket, along with the contour of a part of other than the bottom surface of the bucket and the image of the target construction surface,
wherein an image indicating a part corresponding to a contour of the bottom surface of the bucket is a straight line image which is generated by extracting the part corresponding to the bottom surface of the bucket, and the processing unit changes a display form of the straight line image according to an angle between the bottom surface of the bucket and the target construction surface.

* * * * *